(12) United States Patent
Vam et al.

(10) Patent No.: US 12,215,285 B2
(45) Date of Patent: Feb. 4, 2025

(54) DESULFURIZATION TECHNIQUES

(71) Applicant: University of Dayton, Dayton, OH (US)

(72) Inventors: Albert S. Vam, Dayton, OH (US); Giacomo Flora, Kettering, OH (US)

(*) Notice: Subject to any disclaimer, the term of this patent is extended or adjusted under 35 U.S.C. 154(b) by 31 days.

(21) Appl. No.: 18/310,091

(22) Filed: May 1, 2023

(65) Prior Publication Data
US 2023/0313053 A1    Oct. 5, 2023

Related U.S. Application Data

(63) Continuation of application No. 17/201,903, filed on Mar. 15, 2021, now Pat. No. 11,661,557.

(Continued)

(51) Int. Cl.
| | | |
|---|---|---|
| C10G 53/14 | (2006.01) | |
| B01D 3/14 | (2006.01) | |
| B01D 11/04 | (2006.01) | |
| B01D 17/02 | (2006.01) | |
| B01D 61/16 | (2006.01) | |
| C10G 21/16 | (2006.01) | |
| C10G 21/28 | (2006.01) | |
| C10G 27/04 | (2006.01) | |

(52) U.S. Cl.
CPC ............ *C10G 53/14* (2013.01); *B01D 3/14* (2013.01); *B01D 11/0492* (2013.01); *B01D 17/02* (2013.01); *B01D 61/16* (2013.01); *C10G 21/16* (2013.01); *C10G 21/28* (2013.01); *C10G 27/04* (2013.01); *B01D 2311/2634* (2013.01); *B01D 2311/2669* (2013.01); *B01D 2311/2696* (2013.01); *B01D 2325/38* (2013.01); *C10G 2300/202* (2013.01); *C10G 2300/4081* (2013.01); *C10G 2400/04* (2013.01); *C10G 2400/08* (2013.01)

(58) Field of Classification Search
None
See application file for complete search history.

(56) References Cited

U.S. PATENT DOCUMENTS 4,595,571 A * 6/1986 Galik ................. B01D 11/0434
                                                    422/258
5,466,375 A * 11/1995 Galik ..................... B01D 61/58
                                                    210/651

(Continued)

FOREIGN PATENT DOCUMENTS

GB          871512         6/1961

OTHER PUBLICATIONS

Srivastava, Vimal Chandra; "An evaluation of desulfurization technologies for sulfur removal from liquid fuels"; RSC Advances, 2012, 2, 759-783; Oct. 18, 2011.

(Continued)

*Primary Examiner* — Tam M Nguyen
(74) *Attorney, Agent, or Firm* — Thomas E. Lees, LLC

(57) ABSTRACT

A desulfurization system has an oxidation process unit, and a multi-stage, liquid-liquid extraction unit in series with the oxidation process unit. The multi-stage, liquid-liquid extraction unit spits a fuel input from the oxidation process unit into a desulfurized fuel that is output for use, and a by-product. A solvent/sulfur/hydrocarbon separation process unit receives the by-product from the multi-stage, liquid-liquid extraction unit.

11 Claims, 15 Drawing Sheets

Related U.S. Application Data

(60) Provisional application No. 62/989,815, filed on Mar. 15, 2020.

(56) References Cited

U.S. PATENT DOCUMENTS

| | | | | |
|---|---|---|---|---|
| 5,964,987 | A * | 10/1999 | Duncan | B01D 11/0488 |
| | | | | 203/99 |
| 6,160,193 | A | 12/2000 | Gore | |
| 9,868,911 | B2 | 1/2018 | Reams et al. | |
| 2005/0150156 | A1 | 7/2005 | Karas et al. | |
| 2008/0173571 | A1 * | 7/2008 | Yen | C10G 25/05 |
| | | | | 208/213 |
| 2010/0025301 | A1 | 2/2010 | Borgna et al. | |
| 2013/0026062 | A1 | 1/2013 | Al-Shahrani et al. | |
| 2015/0184086 | A1 | 7/2015 | Rankiin et al. | |
| 2016/0281007 | A1 | 9/2016 | Reams et al. | |
| 2019/0233751 | A1 * | 8/2019 | Medoff | C12P 7/10 |
| 2020/0071619 | A1 * | 3/2020 | Humphreys | C10G 1/065 |
| 2023/0313053 | A1 * | 10/2023 | Vam | C10G 53/14 |
| | | | | 208/244 |

OTHER PUBLICATIONS

IMO; "IMO 2020—cutting sulphur oxide emissions"; located at https://www.imo.org/en/MediaCentre/HotTopics/Pages/Sulphur-2020.aspx, downloaded on Jun. 21, 2021.

Saul, Jonathan; "Factbox: IMO 2020—a major shake-up for oil and shipping"; Reuters; May 17, 2019.

Saul, Jonathan; "Factbox: IMO 2020—a major shake-up for oil and shipping" updated; Reuters; May 17, 2019.

International Search Report and Written Opinion of the International Searching Authority for PCT/US2021/022369; European Patent Office; Rijswijk, Netherlands, date of mailing Jun. 15, 2021.

* cited by examiner

DESULFURIZATION TECHNIQUES

CROSS REFERENCE TO RELATED APPLICATIONS

This application claims priority to and is a continuation of pending U.S. patent application Ser. No. 17/201,903 that was filed on Mar. 15, 2021 that claims the benefit of U.S. Provisional Patent Application Ser. No. 62/989,815, filed Mar. 15, 2020, entitled "DESULFURIZATION TECHNIQUES", the disclosure of which is hereby incorporated by reference.

STATEMENT REGARDING FEDERALLY SPONSORED RESEARCH OR DEVELOPMENT

This invention was made with government support under FA8650-13-D-5600 TO 0004 awarded by the Department of the Air Force. The government has certain rights in the invention.

BACKGROUND

Various aspects of the present disclosure relate generally to desulfurization techniques, and more particularly to the desulfurization of fuels, organic solvents, other non-polar compounds, etc.

Sulfur is an undesirable impurity that is often present in fuels, organic solvents, and other non-polar compounds. For instance, when present in fuels, sulfur can reduce the life of an engine due to corrosion. Moreover, sulfur compounds released in the exhaust gases of diesel engines can significantly impair the emission control technologies designed to meet existing emission standards. Likewise, sulfur in crude oils can cause corrosion in pipelines and other processing components.

BRIEF SUMMARY

According to aspects of the present disclosure, a desulfurization system comprises an oxidation process unit (discussed below as Process Unit 1), a liquid-liquid extraction unit (discussed below as Process Unit 2), a solvent separation process unit (discussed below as Process Unit 3), or combinations thereof. The liquid-liquid extraction unit splits a fuel input, e.g., from the oxidation process unit or other source, into a desulfurized fuel that is output for use. According to further aspects of the present disclosure, the solvent separation process, e.g., a solvent/sulfur/hydrocarbon separation process unit, can be integrated with the liquid-liquid extraction unit, which receives a by-product from the multi-stage, liquid-liquid extraction unit.

According to further aspects of the present disclosure, a desulfurization system comprises an oxidation process unit that outputs a fuel, the fuel comprising an oxidized fuel having sulfur therein. The system also comprises a liquid-liquid extraction unit coupled to the oxidation process unit. The liquid-liquid extraction unit comprises at least one liquid-liquid extraction stage, where each liquid-liquid extraction stage has a mixer and a separation vessel coupled to the mixer. The mixer mixes the oxidized fuel with an extraction fluid, and the output of the mixer is fed to the separation vessel. The separation vessel performs phase separation to separate the mixed oxidized fuel and extraction fluid into a reduced sulfur fuel and a residual, where the residual is comprised of the extraction fluid and sulfur transferred from the fuel. The reduced sulfur fuel exits the separation vessel at a first output and the residual exits the separation vessel at a second output.

In some embodiments, any one or more of the following features can also be implemented in the above desulfurization systems, in any combination:

- the system can include an input of the oxidation process unit that mixes the a high sulfur fuel with an oxidant, and the oxidation process unit comprises a reactor that contains a solid catalyst that does not require activation, does not deactivate with use, or a combination thereof;
- the oxidation process unit can comprise a reactor, a cobalt oxide catalyst, or both;
- the system can further comprise for at least one stage: a pump upstream of the mixer, wherein the oxidized fuel is merged with the extraction fluid to form a combined liquid at the pump, and the pump moves the combined liquid into the mixer for mixing;
- the separation vessel can comprise a column, wherein the reduced sulfur fuel exits the separation vessel at an upper end of the column, and the residual exits the separation vessel at a lower end of the column;
- the separation vessel can further comprise a first phase separator proximate an upper end of the column, a second phase separator proximate a lower end of the column, or a combination thereof;
- the at least one liquid-liquid extraction stage can comprise at least three stages including a first stage, a second stage, and a third stage, wherein: the mixer of the first stage mixes a select one of: the oxidized fuel from the oxidation process unit or a reduced sulfur fuel from a preceding stage, with the residual fluid from the second stage, the mixer of the second stage mixes the reduced sulfur fuel from the first stage with the residual from the third stage, and the mixer of the third stage mixes the reduced sulfur fuel from the second stage with extraction fluid from a source comprised of another stage or a from a solvent storage container;
- each of the first stage, the second stage, and the third stage can further comprise a pump upstream of the corresponding mixer, wherein oxidized fuel is merged with the extraction fluid to form a combined liquid, and the pump moves the combined liquid into the mixer for mixing.
- the system can further comprise a separation unit that receives the residual from the liquid-liquid extraction unit, the separation unit comprised of a distillation column coupled to a phase separation vessel, and a filter coupled to the phase separation vessel, where optionally, the distillation column comprises an atmospheric distillation column where ethanol is distilled from water, which contains higher boiling point aromatics and sulfones, where the distilled ethanol exits the atmospheric distillation column from a first output and the water, high boiling point aromatics and sulfones exit the distillation column from a second output;
- distillation byproducts, including sulfur-carrying hydrocarbons, can be combusted to power the distillation column;
- an aqueous phase can merge with a recycled ethanol alcohol stream to re-adjust a solvent composition comprising the extraction fluid;
- the phase separation vessel can comprise a hydrophobic membrane that forces the separation of sulfones and aromatics as an oil-phase from water, wherein the oil-phase liquid exits the phase separation vessel from a first output and the water exits the phase separation vessel from a second output; or the water that exits the phase separation vessel can pass through the filter and the filtered water can be fed back to the liquid-liquid extraction unit.

According to yet further aspects of the present disclosure, a desulfurization system comprises a liquid-liquid extraction unit that receives an oxidized fuel, where the liquid-liquid extraction unit comprises at least one liquid-liquid extraction stage. Each liquid-liquid extraction stage has a mixer and a separation vessel coupled to the mixer. The mixer mixes the oxidized fuel with an extraction fluid, and the output of the mixer is fed to the separation vessel. The separation vessel performs phase separation to separate the mixed oxidized fuel and extraction fluid into a reduced sulfur fuel and a residual, where the residual is comprised of the extraction fluid and sulfur transferred from the fuel. The reduced sulfur fuel exits the separation vessel at a first output and the residual exits the separation vessel at a second output. The system further comprises a separation processing unit. Here, the separation processing unit comprises a solvent/sulfur/hydrocarbon separation process unit that receives the residual from the liquid-liquid extraction unit, performs a distillation process on the residual, and outputs a first fluid to the liquid-liquid extraction unit, and outputs a second liquid. In this regard, an oil/aqueous phase separator receives the second liquid from the solvent/sulfur/hydrocarbon separation process and outputs a third fluid comprising fuel carrying sulfur compounds, and a fourth output that comprises at least water, aromatics, and sulfones. The system also comprises a filter that filters the fourth output from the oil/aqueous phase separator into a fifth output that is mixed with the oxidized fuel and is fed back into the liquid-liquid extraction unit.

According to still further aspects of the present disclosure, a liquid-liquid extraction system comprises at least one liquid-liquid extraction stage, each liquid-liquid extraction stage comprising a mixer and a separation vessel coupled to the mixer. The mixer mixes a liquid having an undesirable component at an unacceptable level to be reduced, with an extraction fluid, and an output of the mixer is fed to the separation vessel. Separation within the separation vessel separates the liquid mixed with the extraction fluid into liquid having a reduced level of the undesirable component, and a residual that includes the undesirable component removed from the fluid. The liquid having the reduced level of the undesirable component exits the separation vessel at a first output, and the residual exist the separation vessel at a second output.

DETAILED DESCRIPTION

Figure 1:
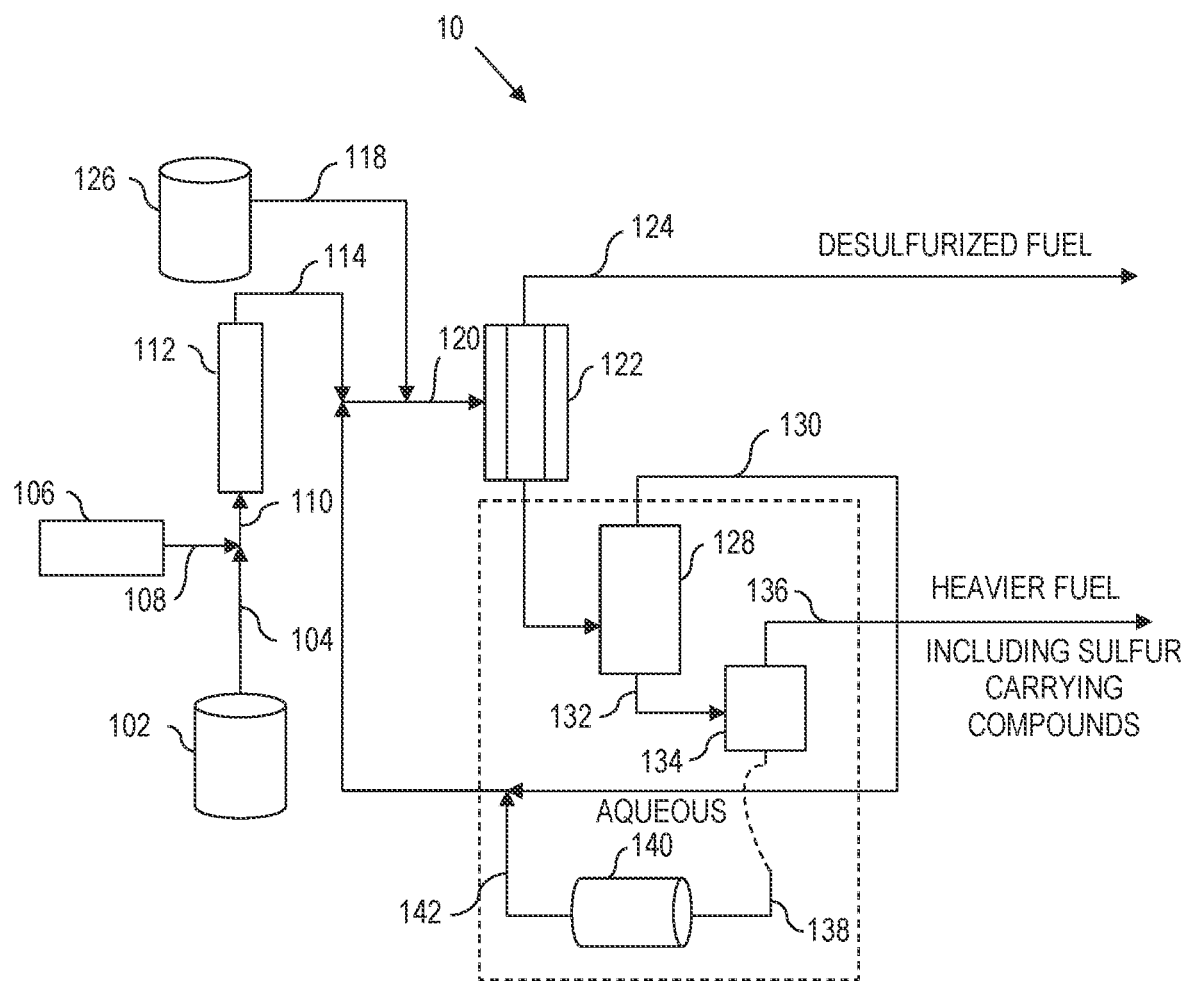
FIG. 1 is a block diagram of a desulfurization system, according to various aspects of the present disclosure.

According to various aspects of the present disclosure, technologies are provided, which efficiently remove impurities from a source. For instance, techniques disclosed herein can achieve very low sulfur impurity concentrations ('deep desulfurization'). Moreover, aspects herein make it possible to economically design, manufacture, and maintain a desulfurization system of compact size, exhibiting low operational costs, and moderate logistical burden. Thus, a desulfurization system can be practically manufactured and transported to a point of need, e.g., to desulfurize significant amounts of fuel. This allows locally procured fuel to be purified at the point of use, even in regions where ultra-low sulfur diesel fuel is not available (or readily available).

In this regard, embodiments can be implemented as a mobile fuel desulfurization system. The mobile fuel desulfurization system can treat sub-specification fuel at the point of need. In this regard, diesel fuels can be produced, which are suitable for land, marine, aviation, and other applications.

By way of example, there is a long-sought and un-met need for mobile fuel processing capability that lowers the levels of sulfur impurity in commercially available 'street' fuel products for diesel-engine equipment, at the location where the fuel will be used. For instance, United States (US) and European Union (EU) specification diesel-powered equipment requires ultra-low sulfur fuel. In this regard, US and EU laws restrict the allowable levels of sulfur in fuels for vehicles and ground equipment to 15 parts per million (ppm) and 10 ppm, respectively.

Although US-based petroleum refineries and EU-based petroleum refineries have implemented sulfur removal technologies, refineries in many other worldwide locations have not invested in the massive and expensive upgrades necessary for producing ultra-low sulfur fuels. Therefore the required ultra-low sulfur fuel is often not available in many regions of the world. The use of locally available, non-specification, high-sulfur fuel in US or EU diesel equipment can damage or destroy the equipment, or otherwise render the equipment useless. Accordingly, aspects of the present disclosure address the above issues by providing fuel desulfurization techniques that can process sub-specification fuel at the point of need. Further aspects desulfurize fuel and keep all other fuel properties within specifications.

Moreover, according to further aspects herein, techniques are provided to mix high sulfur fuel with a polar solution so as to pull the sulfur from the fuel. For instance, by distilling ethanol from a distillate, sulfur and aromatics will remain within a distilling vessel. The sulfur and aromatics can be removed, enabling the aromatics to be filtered from the sulfur, e.g., using a catalyst bed to remove the aromatics. The sulfur can then be combusted and the energy from the combustion harvested and fed back into the system to minimize waste.

Example Liquid-Based Petroleum Fuel Desulfurization System

Referring to drawings and in particular FIG. 1, a diesel fuel desulfurization process 100 is illustrated according to aspects of the present disclosure.

A high sulfur fuel feed tank 102 provides a first output 104. In this example embodiment, the high sulfur fuel tank 102 stores high sulfur fuel that will be processed to reduce sulfur levels therein, e.g., to produce desulfurized fuel.

As used herein, desulfurized fuel need not be free of sulfur. Rather, the term "desulfurized fuel" means fuel having sulfur levels reduced from an initial starting state, such as to a level that is within or below a predefined specification. Here, the specification may be based upon law, based upon a specific requirement of a device or devices that are consuming the desulfurized fuel, etc.

An oxidant generator 106 provides a second output 108. In some embodiments, the oxidant generator 106 can be implemented as a holding tank, such as in the case where liquid oxidant is used. The first output 104 and the second output 108 mix into a first mixed source 110, which feeds an oxidation process unit.

The oxidation process unit is implemented in the embodiment of FIG. 1, as an oxidation reactor 112 (also referred to as Process Unit 1), which receives as an input, the mixed source 110, and provides a third output 114, e.g., an oxidized fuel. As will be described in greater detail herein, the oxidation reactor 112 provides an environment where the fuel from the high sulfur fuel feed tank 102 and the oxidant from the oxidant generator 106 can react, e.g., at least a portion of the fuel components (including the sulfur-carrying sulfide impurities of the fuel) are oxidized. In some embodiments the oxidation reactor receives the first mixed source 110, which is pre-mixed, e.g., using appropriate valves, mixers, or other hardware. In other embodiments, the first output 104 and the second output 108 each input into the oxidation reactor 112 such that mixing is accomplished internal to the oxidation reactor 112.

Also, a fresh solvent holding tank 116 provides a fourth output 118. The third output 114 and the fourth output 118 mix into a second mixed source 120.

A liquid-liquid extraction unit 122 (also referred to as Process Unit 2) receives as an input, the second mixed source 120. The liquid-liquid extraction unit 122 provides a fifth output 124 that comprises a desulfurized fuel output. The liquid-liquid extraction unit 122 can also provide a sixth output 126. In this regard, the liquid-liquid extraction unit 122 can split desulfurized fuel (fifth output 124) from a residual (sixth output 126). In some embodiments, the liquid-liquid extraction unit 122 receives the second mixed source 120, which is pre-mixed, e.g., using appropriate valves, mixers, or other hardware. In other embodiments, the third output 114 and the fourth output 118 each input into the liquid-liquid extraction unit 122 such that mixing is accomplished internal to the liquid-liquid extraction unit 122.

The liquid-liquid extraction unit 122 can be implemented using one or more stages, examples of which are described in greater detail herein. In some embodiments, e.g., where multiple stages are utilized, Process Unit 2 can be referred to as a multi-stage, rapid liquid-liquid extraction unit 122.

In some embodiments, a solvent/sulfur/hydrocarbon separation process unit 128 receives the sixth output 126 and can provide a seventh output 130 that can feed back into the multi-stage, rapid liquid-liquid extraction unit 122. For instance, the solvent/sulfur/hydrocarbon separation process unit 128 can comprise a distillation process, e.g., via an atmospheric distillation column. By way of example, distillation can be used to separate the ethanol, which is the lightest component, from water, the higher boiling point aromatics and sulfones. As such, the seventh output 130 can comprise the distilled ethanol, e.g., EtOH+light HCs. Depending on the operating conditions, distillation can also be used to separate both of the ethanol and most (not all) of the water from the higher boiling point aromatics and sulfones.

Here, the seventh output 130 can mix with one or more of the third output 114 and/or fourth output 118 prior to entering the liquid-liquid extraction unit 122, or the seventh output 130 can enter the liquid-liquid extraction unit 122 where it can be mixed internally. More particularly, the seventh output 130 can feed back directly to an input of the liquid-liquid extraction unit 122, e.g., either pre-mixing with the third output 114 and/or fourth output 118, or feed directly into the liquid-liquid extraction unit 122. Alternatively, the seventh output 130 can feed back to the liquid-liquid extraction unit 122 via one or more mixers, devices, processes, combinations thereof, etc.

In some embodiments, the solvent/sulfur/hydrocarbon separation process unit 128 also provides an eighth output 132 that feeds into an oil/aqueous phase separator 134. In the example of a distillation process, the eighth output 132 can comprise water, higher boiling point aromatics, sulfones, etc. (e.g., Heavy HC's+$H_2O$ with soluble components).

The oil/aqueous phase separator 134 outputs a ninth output 136 comprised of heavier fuel, including sulfur-carrying compounds. In some embodiments, the oil/aqueous phase separator 134 can also output a tenth output 138 comprising an aqueous flow to a filter 140. Keeping with the distillation embodiment, as noted above, water, high boiling point aromatics and sulfones exit the distillation column, e.g., from the bottom of the distillation column, (solvent/sulfur/hydrocarbon separation process unit 128) to enter the oil/aqueous phase separator 134 in which the sulfones and aromatics form a separate layer and separate from the water. The sulfones and aromatics exit the oil/aqueous phase separator 134 at output 136, whereas the water exits at output 138.

In an example embodiment, the oil/aqueous phase separator 134 is implemented as an oil/aqueous separating vessel having a hydrophobic member, e.g., a hydrophobic membrane, a disk made of hydrophobic material, etc., placed near the top of the phase separating vessel, which forces the separation of the sulfones and aromatics (the oil phase) from the water-rich phase. The oil phase exiting the top of the oil/aqueous separator 134 as schematically shown, can be captured and used, for example, in an oil-fired steam generator to contribute the energy required for distillation and eliminate waste.

In example embodiments, the filter 140 provides an eleventh output 142 that can also feed back to the input of the liquid-liquid extraction unit 122. The eleventh output 142 comprises filtered water. For instance, in an example embodiment, the output 138 is passed over an activated carbon or silica gel bed to remove water soluble hydrocarbons, and the output is provided at 142.

In some embodiments, the system 100 is rapid in processing and can be implemented in a manner that is mobile, allowing high sulfur fuel to be processed on demand.

Example Liquid-Based Petroleum Fuel Desulfurization System

Figure 2:
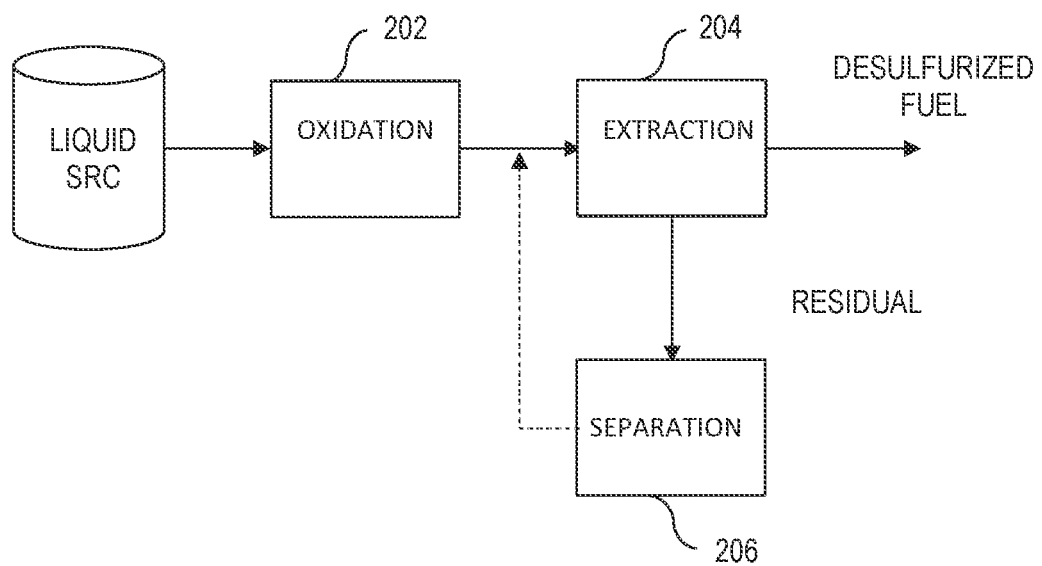
FIG. 2 is a block diagram of select processing components of a desulfurization system, according to aspects of the present disclosure.

Referring to FIG. 2, a liquid fuel desulfurization process 200 is illustrated according to aspects herein. The fuel desulfurization process 200 is comprised of three primary process units, including an oxidation process unit 202 (Process Unit 1), a liquid-liquid extraction unit 204 (Process Unit 2), and a solvent/sulfur/hydrocarbon separation process unit 206 (Process Unit 3).

The oxidation process unit 202 receives a high sulfur liquid and oxidizes at least a portion of the fuel components (including the sulfur-carrying sulfide impurities of the fuel). The liquid-liquid extraction unit is in series with the oxidation process unit 202. The liquid-liquid extraction unit 204 separates a liquid received from the oxidation process unit 202 into a desulfurized fuel and a residual. The solvent/sulfur/hydrocarbon separation process unit 206 accepts the residual from the liquid-liquid extraction unit 204. In some embodiments, the solvent/sulfur/hydrocarbon separation process unit 206 can filter the residual and feed back solution to the liquid-liquid extraction unit 204.

By way of illustration, the oxidation process unit 202 can be implemented by the oxidation reactor 112 (FIG. 1) or other analogous processes described more fully herein. Analogously, the liquid-liquid extraction unit 204 can be implemented by the multi-stage, rapid liquid-liquid extraction unit 122 (FIG. 1) or other analogous processes described more fully herein. In this regard, the liquid-liquid extraction unit 122 can comprise one or more stages. Individual and multiple stage examples are set out in greater detail herein. Yet further, the solvent/sulfur/hydrocarbon separation process unit 206 can be implemented by one or more of the solvent/sulfur/hydrocarbon separation process unit 128, oil/aqueous phase separator 134, and filter 140 or other analogous processes described more fully herein.

In the illustrative example, the oxidation process unit 202 (Process Unit 1) and the liquid-liquid extraction unit 204 (Process Unit 2) are used in series to remove sulfur from fuel in continuous flow operation. The solvent/sulfur/hydrocarbon separation process unit 206 (Process Unit 3) is utilized to recover and recycle the solvent used in the liquid-liquid extraction unit 204 and separate the solvent from residual by-products. The solvent/sulfur/hydrocarbon separation process unit 206 thus allows for solvent reuse.

In some embodiments, the residual, e.g., by-products from the liquid-liquid extraction unit 204 are combusted to power a distillation unit of the solvent/sulfur/hydrocarbon separation process unit 206, making the desulfurization process an economical, waste-free (or waste-reduced), self-contained, closed-loop operation.

As such, in a practical application, aspects herein can be utilized to efficiently remove sulfur-containing impurity molecules from hydrocarbon liquid fuels (and thus perform 'desulfurization'). In an example implementation of the above application, the removal of sulfur containing impurity molecules is carried out in continuous flow and can use a closed-loop arrangement that recycles a solvent that is used to extract sulfur from the hydrocarbon liquid fuels.

With reference to FIG. 1 and FIG. 2 generally, the systems herein illustrate various components that can be utilized alone or in any combination or combinations thereof. For instance, the (multi-stage, rapid) liquid-liquid extraction unit 122 (FIG. 1) and/or liquid-liquid extraction unit 204 can be implemented as a structure that can be utilized in applications outside the illustrated example systems. Moreover, as will be described in illustrative examples herein, the liquid-liquid extraction unit 122 (FIG. 1) and/or liquid-liquid extraction unit 204 may, in some embodiments, utilize a multi-head pumping system, described more fully herein.

As yet another example, the solvent/sulfur/hydrocarbon separation process unit 128 (FIG. 1) and/or solvent/sulfur/hydrocarbon separation process unit 206 (FIG. 2) can be utilized as a structure that can be utilized in applications outside the illustrated example systems.

As yet another illustrative example, the liquid-liquid extraction unit 122 (FIG. 1) and/or the liquid-liquid extraction unit 204 (FIG. 2) can be combined with the oxidation reactor 112 (FIG. 1) and/or the oxidation reactor 202 (FIG. 2) to provide a powerful deep fuel desulfurization process, e.g., either alone or in combination with other features set out herein.

Analogously, the liquid-liquid extraction unit 122 (FIG. 1) and/or the liquid-liquid extraction unit 204 (FIG. 2) can be combined with the solvent/sulfur/hydrocarbon separation process unit 128 (FIG. 1) and/or solvent/sulfur/hydrocarbon separation process unit 206 (FIG. 2), either alone or in combination with other features set out herein, e.g., to implement a rapid liquid-liquid extraction and solvent recovery system for use with the instant system, or other suitable chemical processes.

In yet further examples, a system can be implemented including the oxidation reactor (Process Unit 1—e.g., the oxidation reactor 112, FIG. 1, and/or the oxidation reactor 202, FIG. 2), the rapid liquid-liquid extraction unit (Process Unit 2—e.g., the liquid-liquid extraction unit 122, FIG. 1 and/or the liquid-liquid extraction unit 204, FIG. 2), and the solvent/sulfur/hydrocarbon separation process unit (Process Unit 3—e.g., the solvent/sulfur/hydrocarbon separation process unit 128, FIG. 1 and/or solvent/sulfur/hydrocarbon separation process unit 206, FIG. 2), optionally in combination with other features described more fully herein.

Example Oxidation Reactor (Process Unit 1)

Figure 3:
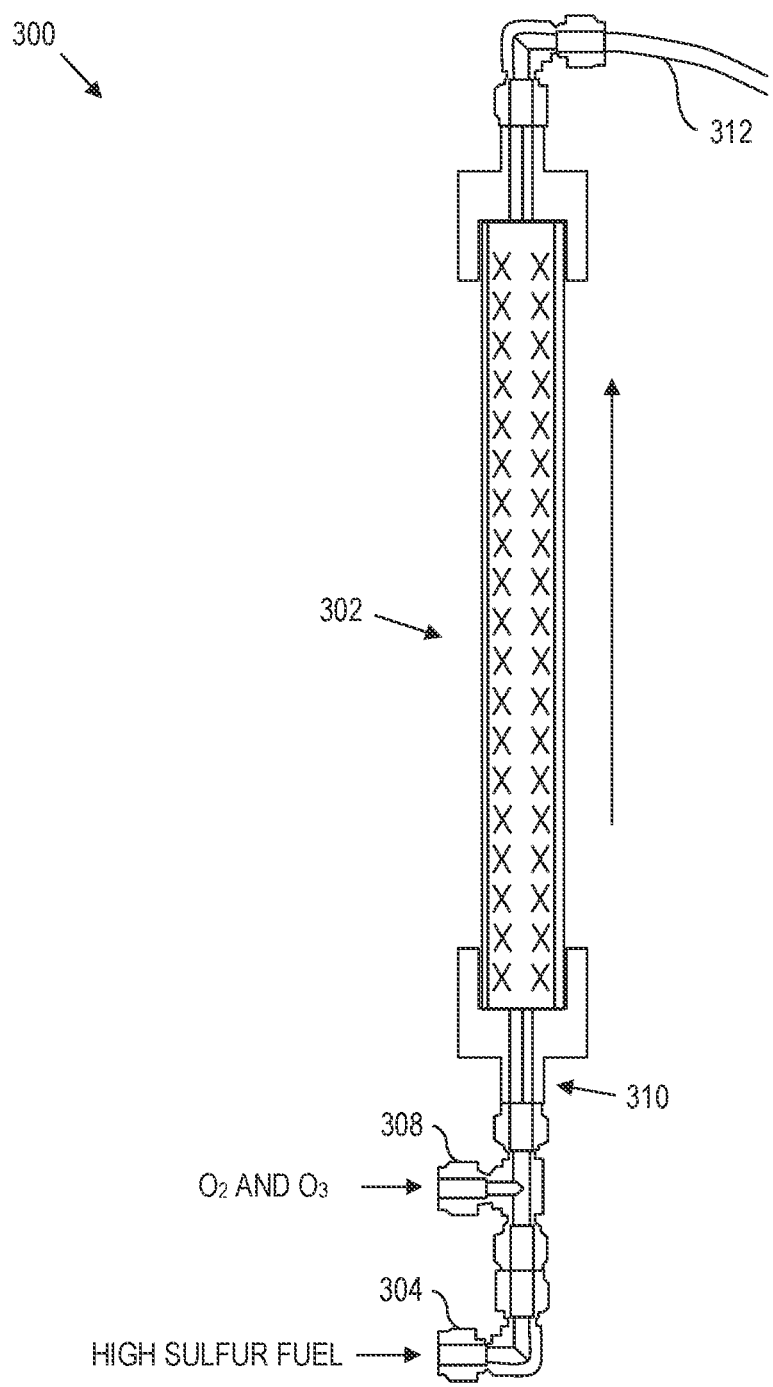
FIG. 3 is an example oxidation reactor process unit, which can be utilized in the system of FIG. 1 and/or FIG. 2.

As noted in greater detail herein, the oxidation process unit can be implemented as an oxidation reactor. Referring now to FIG. 3, an example of an oxidation reactor 300 is illustrated, according to aspects of the present disclosure. The oxidation reactor 300 can be utilized to implement the oxidation reactor 112, FIG. 1 and/or the oxidation reactor 202, FIG. 2.

The illustrated oxidation reactor 300 can be implemented as a fixed-bed reactor having a fixed bed 302 that contains a specific amount of a solid catalyst. The solid catalyst provides a substrate surface for a reaction between a fuel and an oxidant. In some embodiments, the solid catalyst requires no activation step.

High sulfur fuel is pumped from a high sulfur fuel feed tank (e.g., see high sulfur fuel tank 102 (FIG. 1) via a first output 304 into the fixed bed 302 of the oxidation reactor at a specific flow rate.

Also, an oxidant is pumped from an oxidant source (e.g., the oxidant generator 106, FIG. 1) via a second output 308 into the fixed bed 302 of the oxidation reactor 300 at a specific flow rate.

As an example, O2, O3, a combination of O2+O3, etc., can be used as an oxidant. For instance, ozone (O3) can be generated using an O3 generator that is fed with an O2 feed gas stream. A portion of the O2 feed stream is converted to O3. By way of example, the ozone generator is fed high purity O2, which could come from cylinders or an O2 concentrator system. The O3 generator converts a fraction of the oxygen to O3. The mixed O2/O3 gas) stream is then bubbled into the high sulfur fuel stream just before both enter the into the fixed bed 302 of the oxidation reactor 300, e.g., as a first mixed source 310.

The gas oxidant and liquid fuel reactants flow over the catalyst bed 302 where a portion of the fuel components (including the sulfur-carrying sulfide impurities) are oxidized. Upon oxidation, the sulfides are converted first to sulfoxides and then to the yet more polar sulfones having two oxygen atoms per sulfur atom. Sulfones are substantially more polar than the sulfides. The liquids and gases then exit the fixed bed 302 of the oxidation reactor 300 via the third output 312.

In an example embodiment, a catalyst can perform the required oxidation at ambient temperature and pressure oxidant. For instance, in an illustrative example, the reaction can take place at ambient temperature and @40 pounds per square inch (psi) of pressure.

In some embodiments, the oxidation reactor 300 can comprise a continuous fixed-bed, stirred-tank, or other type that can achieve the same reaction.

In some embodiments, an oxidant type can comprise Ozone (O3) using an O3 generator. Two example methods to producing ozone include ultra-violet and corona discharge. Corona discharge creates ozone by applying high voltage to a metallic grid sandwiched between two dielectrics. The high voltage jumps through the dielectric to a grounded screen and in the process and creates ozone from oxygen present in the chamber. Ultra-violet (UV) light creates ozone when a wavelength at 254 nm (nanometers) hits an oxygen atom. The molecule (O2) splits into two atoms (O), which combine with another oxygen molecule (O2) to form ozone (O3). However, other types of oxidants can be used.

In some embodiments, an oxidation catalyst can be a solid, a catalyst that does not require an activation step, a catalyst that does not show signs of deactivation over a predetermined time (e.g., at least 72 hours of operation), combination thereof, etc. In certain embodiments, the catalyst does not de-activate with use. In certain embodiments, a solid catalyst does not require activation, and does not de-activate with use.

In some embodiments, oxidation reaction temperatures can vary, e.g., in a range −20 degrees fahrenheit to 125 degrees fahrenheit (approximately −28.8 to 51.7 degrees Celsius).

In some embodiments, the oxidation reaction in such a way so as to require system liquid pressures only slightly above atmospheric (to pump the liquids). As an example embodiment, the pressure can range from 14-25 pounds per square inch (psi). In other embodiments, the pressure can exceed 25 psi. In some embodiments, the oxidation reaction pressure can be lower than 14 psi.

In some embodiments, weight hourly space velocity can be controlled. For instance, in certain embodiments, a weight hourly space velocity can range from 12-22. In other embodiments, the weight hourly space velocity can range slightly above 22 or slightly below 12.

Notably, the desulfurization oxidation process unit 300 can be implemented to desulfurize fuel that contains no gumming, making the fuel suitable for use in US EPA Tier 4 internal combustion engines.

The process works effectively over a wide range of indoor and outdoor ambient temperatures and/or pressures, requiring no heating or cooling, or enclosure for same.

Also, relatively fast processing rates per square foot or small footprint are realized. ODS occurs at a high liquid hourly space velocity (WHSV) (weight hourly space velocity: quotient of the mass flow rate of the reactant divided by the mass of the catalyst in the reactor) ranging from 20-40 in an illustrative example.

Also, the structure illustrated in FIG. 3 is compact, lightweight, has a minimal energy requirement, and operates at room temp and pressure. For instance, in some embodiments, heavy-gauge steel is not required.

Notably, in some embodiments, a consumable is the catalyst, which does not de-activate. No hydrogen is required (hydrogen handling is problematic for handling and storage), thus making the process easy to scale up and down. Also, the structure illustrated in FIG. 3 can be operated with no gum formation.

Example Oxidation Catalyst

In some embodiments, the oxidation catalyst within the catalyst bed can comprise a cobalt oxide catalyst that requires no activation step. In alternative embodiments, the oxidation process may comprise a fixed bed reactor and cobalt oxide catalyst.

In an example implementation, a cobalt catalyst showed a high level of reactivity and quickly oxidized the sulfides to sulfone. The catalyst showed no signs of deactivation during or after processing approximately 300 gallons of fuel.

Other solid catalysts may be suitable with various applications. However, in fuel desulfurization, a cobalt oxide catalyst is well suited for the application. In addition to excellent performance in oxidizing the sulfur carrying molecules and the long lifetime, when oxidation is followed by a liquid-liquid extraction, the product fuel can be rendered undamaged. In an illustrative example, a liquid-liquid solvent can comprise a mixture of alcohol(s) and water with different variations in the composition, e.g., ethanol/methanol/water, ethanol/water, etc. Such solvents have low solubility in the product desulfurized (e.g., no contamination). Other aqueous solutions may be compatible with particular applications.

Liquid-Liquid Extraction Process Unit (EPU)

Figure 4A:
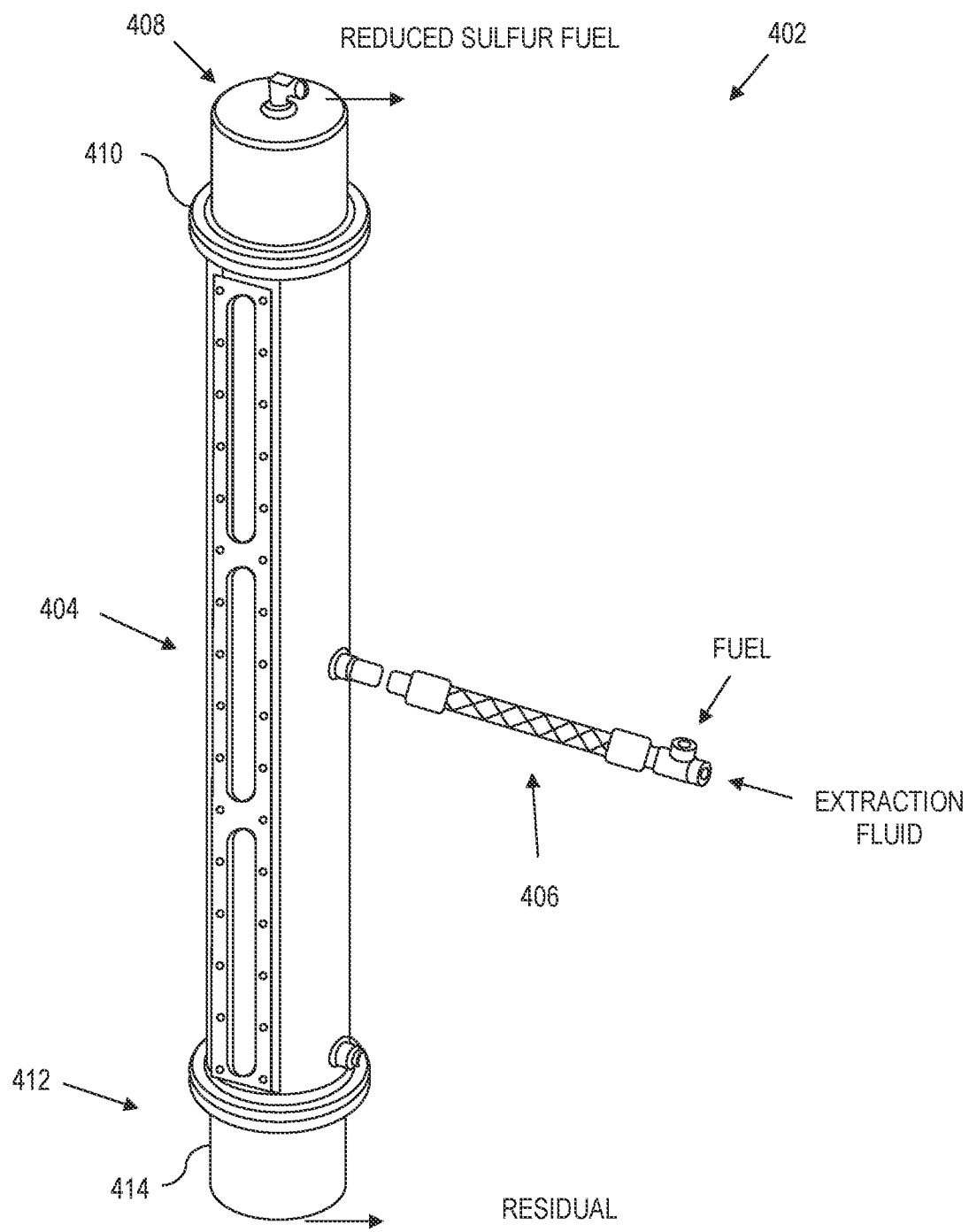
FIG. 4A is an example liquid-liquid extraction unit, which can be utilized in the system of FIG. 1 and/or FIG. 2.

Referring to FIG. 4A, an example liquid-liquid extraction process stage 402 is illustrated, according to various aspects of the present disclosure. The illustrated liquid-liquid extraction process stage 402 can implement the liquid-liquid processing unit 122 (FIG. 1) and/or the liquid-liquid processing unit 204 (FIG. 2). FIG. 4A shows a single stage. In an example embodiment of a multi-stage the liquid-liquid processing unit, the liquid-liquid extraction process stage 402 can be implemented in multiple instances, connected together, e.g., in series.

In an example embodiment, each extraction stage implements a two-step process.

A first step includes mixing of an oxidized fuel with a solvent to transfer the solute (in this case, sulfur) from fuel to the solvent.

In a second step, phase separation is utilized to separate the fuel from the solvent liquids.

In this example, each liquid-liquid extraction process stage 400 is comprised of a separation vessel 404 (e.g., cylindrical column) coupled to a static mixer 406. In some embodiments, the separation vessel 404 can be embedded with phase separator(s) to (rapidly) force the separation of liquids. Phase separators may or may not be used. Moreover, where phase separators are used, there may be one phase separator, two phase separators, etc.

By way of example, as illustrated, a first phase separator 408 is located at an upper flange 410, and a second phase separator 412 is located at a lower flange 414 of the column. Under this configuration, a fuel with lower sulfur can exit the separation vessel 404 at the upper flange 410, e.g., to enter a next stage in a multi-stage embodiment, or otherwise exit the process. Likewise, an extraction fluid with a higher sulfur concentration can exit the separation vessel 404 at the lower flange 414 to enter a next stage of extraction in the case of a multi-stage embodiment, or otherwise exit the process.

The inline static mixer 406 is sized and designed to ensure most effective mixing of oxidized fuel with the solvent. More particularly, mixed liquid, such as a fuel with relatively higher sulfur, extractions fluid with lower sulfur, a combination thereof, etc., is mixed in the static mixer 406. The mixed liquids exit the static mixer 404 and enter the separation vessel 404. The oil phase starts to coalesce and rise upwards to the top of the separation vessel 404. The heavy (aqueous) phase coalesces and moves downwards the bottom of the separation vessel 404. The separation vessel 404 is sized to allow sufficient residence time for effective transfer of sulfur from the oil phase to the aqueous phase, then allows separation of the oil and aqueous phases from each other without interference from the mixer/mixing.

As noted above, in some embodiments, phase separators are not strictly required. This is because gravity will eventually separate the oil phase from the aqueous phase due to difference in density. However, the use of one or more phase separator(s) can be included inside the separation vessel 406 to force a more rapid and complete phase separation, allowing higher processing rates per footprint and much higher fuel volumes.

The phase separators can be installed, for example, horizontally above the fuel inlet and/or below the fuel outlet.

As the oxidized compounds are extracted from the fuel and into the solvent, an ultra-low sulfur fuel product leaves the ultimate stage of the liquid-liquid extraction unit, e.g., and can be collected and sent to any storage tank.

As noted above, one or more stages can be implemented. In this regard, several factors can influence the number of required stages. For instance, the oxidation reactor parameters can affect the number of stages. As a few illustrative examples, lower reaction temperature can yield desulfurization with fewer extraction stage (ozone solubility increases in colder temperature). Higher ozone concentration in the oxygen/ozone gas stream can yield desulfurization with fewer extraction stages. Higher reactor pressure can yield desulfurization with fewer number of stages. O3/O2 flow rate can also impact the number of stages. For instance, higher flow rates can result in faster extraction. Other parameters that can be tuned, e.g., based upon desired performance, include the amount of catalyst as a function of flow rate.

Further, the liquid-liquid extraction processing parameters can influence the number of required stages. For instance, higher fluid temperature can yield desulfurization with fewer stages. A higher volumetric ratio of ethanol to fuel can also yield desulfurization with fewer stages.

Figure 4B:
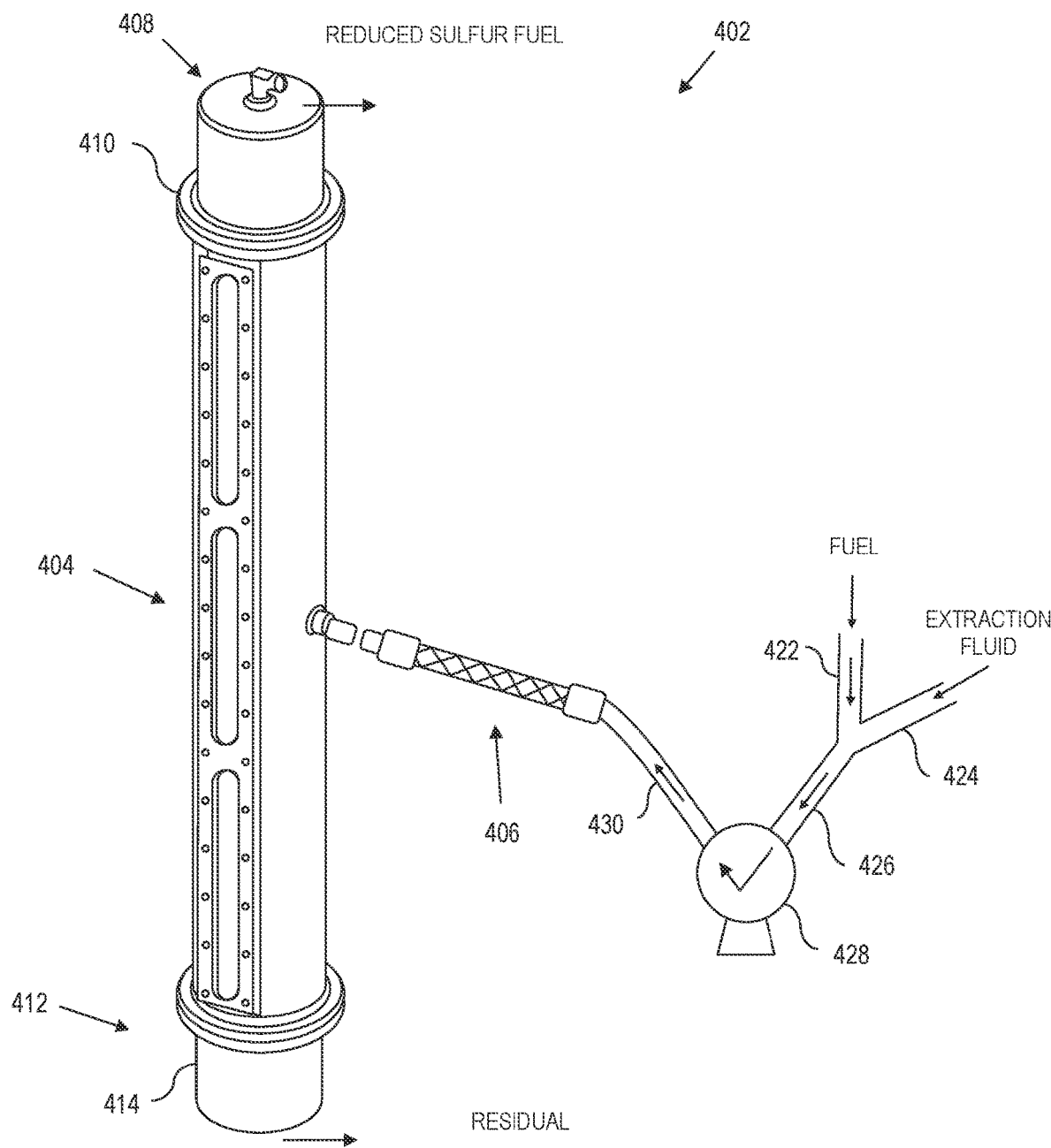
FIG. 4B is another example liquid-liquid extraction unit, which can be utilized in the system of FIG. 1 and/or FIG. 2.

Referring to FIG. 4B, another example liquid-liquid extraction process stage 402 is illustrated, according to various aspects of the present disclosure. The illustrated liquid-liquid extraction process stage 402 can implement the liquid-liquid processing unit 122 (FIG. 1) and/or the liquid-liquid processing unit 204 (FIG. 2). The liquid-liquid extraction process stage of FIG. 4B is analogous to the liquid-liquid extraction process stage of FIG. 4A, so like structure is illustrated with like reference numbers. In this regard, the disclosure with regard to FIG. 4A is adopted and applied to FIG. 4B, and as such the differences are discussed below.

Notably, instead of the fuel and extraction fluid entering a static mixer 406, FIG. 4B illustrates the fuel entering via a first line 422. The extraction fluid enters via a second line 424. The first line 422 and second line 424 can optionally merge via a third line 426, which directs a combined liquid (e.g., oxidized fuel and extraction fluid) to a pump 428. The pump 428 pumps the fluids via a fourth line 430 to the static mixer 406. In some embodiments the first line 422 and second line 424 may both enter the pump 428. Other configurations can also be implemented.

Extraction Unit Process flow

Oxidized fuel exiting the oxidation unit 112 (FIG. 1), oxidation unit 202 (FIG. 2) oxidation unit 300 (FIG. 3), etc., can be configured to enter an extraction unit 122 (FIG. 1), extraction unit 204 (FIG. 2) extraction unit 400 (FIG. 4A. FIG. 4B), etc., where the oxidized fuel counter-flows the polar aqueous extraction solvent. The extraction unit can be a single stage, multiple stages, etc. EtOH-140 can be used, but other solvents could be used depending on the application and the required fuel quality. The aqueous solvent progressively removes the sulfones from the fuel in increments, ultimately reducing the overall sulfur content in the fuel to the specified levels.

An example target of under 15 parts per million (ppm) of sulfur in the raffinate was achieved at the end of a staged liquid-liquid extraction. At this point, the raffinate is ready to go to storage or is ready to be immediately used. Depending on the solvent type and the potential use for the fuel, a fuel-polishing step may be required to remove solvent traces. Notably, the ultra-low sulfur fuel produced hereby has minimal amounts of oxygenates and gumming, and meets ground equipment fuel specifications.

By way of example, in some embodiments, a controlled method of fuel desulfurization utilizes oxidative desulfurization yielding required sub 15 ppm of s while maintaining gum levels within jet fuel gum specifications, e.g., 7 mg/10 mL, and minimal, undetected amounts of oxygenates.

In typical applications, 5-20 stages may be required to reach ultra-low sulfur levels of <15 ppm, e.g., from up to 2200 ppm depending on process conditions. It is also possible that some batches of fuel may require more than 20 stages, e.g., depending on the nature of the fuel.

Example Three Stage Process

Figure 5:
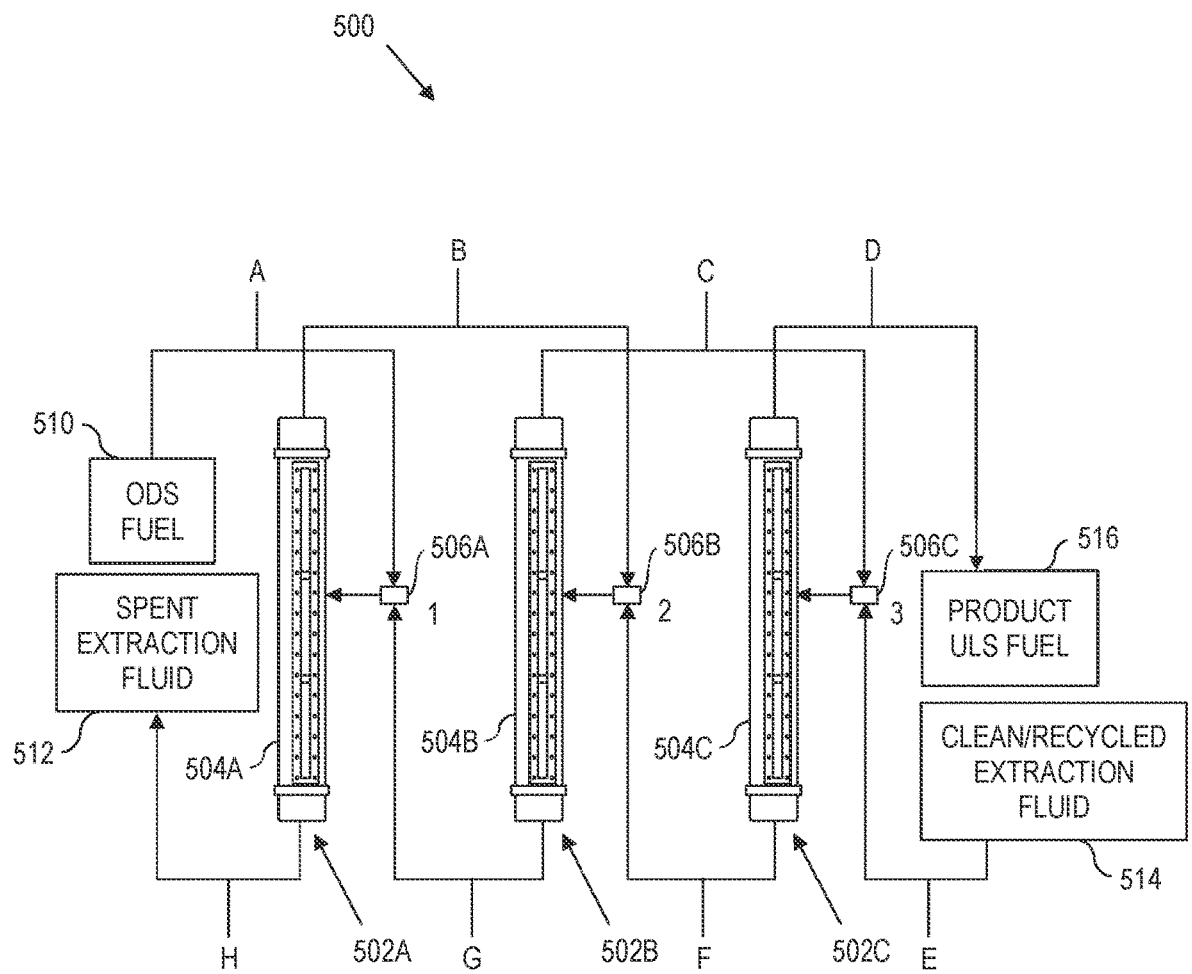
FIG. 5 is an example three-stage liquid-liquid extraction unit, which can be utilized in the system of FIG. 1 and/or FIG. 2.

Referring to FIG. 5, in order to simplify the illustration of the step-by-step process, a three-stage version of a liquid-liquid extraction system 500 is shown. However, in practice, two stages can be used, or more than three stages can be used, e.g., by cascading stages as described herein.

The example liquid-liquid extraction system 500 is operated in counter-flow mode. For instance, where the oxidized fuel moves through the system from left to right, the solvent moves through the system from right to left.

As illustrated, the three-stage liquid-liquid extraction system 500 comprises three instances of a liquid-liquid extraction process stage 502, designated 502A, 502B, and 502C, respectively. Each liquid-liquid extraction process stage 502 can be implemented for example, as a liquid-liquid extraction unit 122 (FIG. 1), liquid-liquid extraction unit 204 (FIG. 2), a liquid-liquid extraction process stage 402 (FIG. 4A), a liquid-liquid extraction process stage 402 (FIG. 4B), or a combination thereof. In this regard, each liquid-liquid extraction process stage 502 comprises a separation vessel 504 (e.g., 504A, 504B, 504C) coupled to a static mixer 506 (e.g., 506A, 506B, 506C).

In the three stage liquid-liquid extraction unit, oxidized fuel is pumped from an oxidized fuel tank 510 through line "A" and is injected into the static mixer 506A at point "1" where it meets the solvent exiting the liquid-liquid extraction process stage 502B, in line "G".

Both of the fuel and solvent mix at point "1" (Stage 1), then together they enter the static mixer 506A for additional and more rigorous mixing, to allow for effective mass transfer of the sulfur-carrying molecules from fuel to the solvent.

The well-mixed fluids then enter the separation vessel 504A where the fluids are allowed just enough time to begin to separate by gravity.

Fuel (the lighter phase) droplets begin to separate from the solvent, coalesce then rise to the top of the separation vessel. Similarly, most of the solvent droplets begin to fall to the bottom of the separation vessel (heavier phase).

As the fuel rises up in the separation vessel 504A, especially at high flow rates (less time for gravity separation), the fuel pulls up considerable amounts of solvent that has not yet separated. For this reason, a hydrophobic material disk or membrane can be installed just below the fuel outlet to only allow the fuel to rise past it and exit from the top fuel outlet in line B to the next extraction stage, while rejecting the solvent from passing and forcing the separation.

The solvent continually exits the separation vessel 504A through line "H" and is collected in a spent extraction fluid container 512, or is sent directly to storage, e.g., for recycling.

Fuel leaving the separation vessel 504A through line B is injected in point 2 (stage 2) where the fuel meets the solvent, line "F" exiting the separation vessel 504C (first from the right).

Both of the fuel and solvent mix at point "2" (Stage 2), then together enter the static mixer 506B for additional and rigorous mixing required to effectively mass transfer the sulfur-carrying molecules from fuel to the solvent.

The well-mixed fluids then enter the separation vessel 504A where the fluids are allowed just enough time to begin to separate by gravity.

Fuel (the lighter phase) droplets begin to separate from the solvent, coalesce then rise to the top of the separation vessel. Similarly, most of the solvent droplets begin to fall to the bottom of the separation vessel (heavier phase).

As the fuel rises up in the separation vessel 504B, especially at high flow rates (less time for gravity separation), the fuel pulls up considerable amounts of solvent that has not yet separated. For this reason, a hydrophobic material disk or membrane can be installed just below the fuel outlet to only allow the fuel to rise past it and exit from the top fuel outlet in line C to the next extraction stage, while rejecting the solvent from passing and forcing the separation.

The solvent continually exits the separation vessel 504B through line "G" and is coupled to the first static mixer 506A as noted above.

Fuel leaving the separation vessel 504B through line C is injected in point 3 (stage 3) where the fuel meets the solvent, line "E" exiting the fluid container 514 (e.g., a clean/recycled extraction fluid container).

Both of the fuel and solvent mix at point "3" (Stage 3), then together they enter the static mixer 506C for additional and more rigorous mixing, to allow for effective mass transfer of the sulfur-carrying molecules from fuel to the solvent.

The well-mixed fluids then enter the separation vessel 504C where the fluids are allowed just enough time to begin to separate by gravity.

Fuel (the lighter phase) droplets begin to separate from the solvent, coalesce then rise to the top of the separation vessel. Similarly, most of the solvent droplets begin to fall to the bottom of the separation vessel (heavier phase).

As the fuel rises up in the separation vessel 504C, especially at high flow rates (less time for gravity separation), the fuel pulls up considerable amounts of solvent that has not yet separated. For this reason, a hydrophobic material disk or membrane can be installed just below the fuel outlet to only allow the fuel to rise past it and exit from the top fuel outlet in line B to the next extraction stage, while rejecting the solvent from passing and forcing the separation. The solvent continually exits the separation vessel 504C through line "F" and is coupled to the first static mixer 506B as noted above.

Fuel leaving the separation vessel 504C through line D is collected as product fuel in container 516. For instance, fuel leaving the vessel through line "D" is collected as the product ultra-low sulfur fuel. The above-three step example can be extended to any number of stages.

Figure 6:
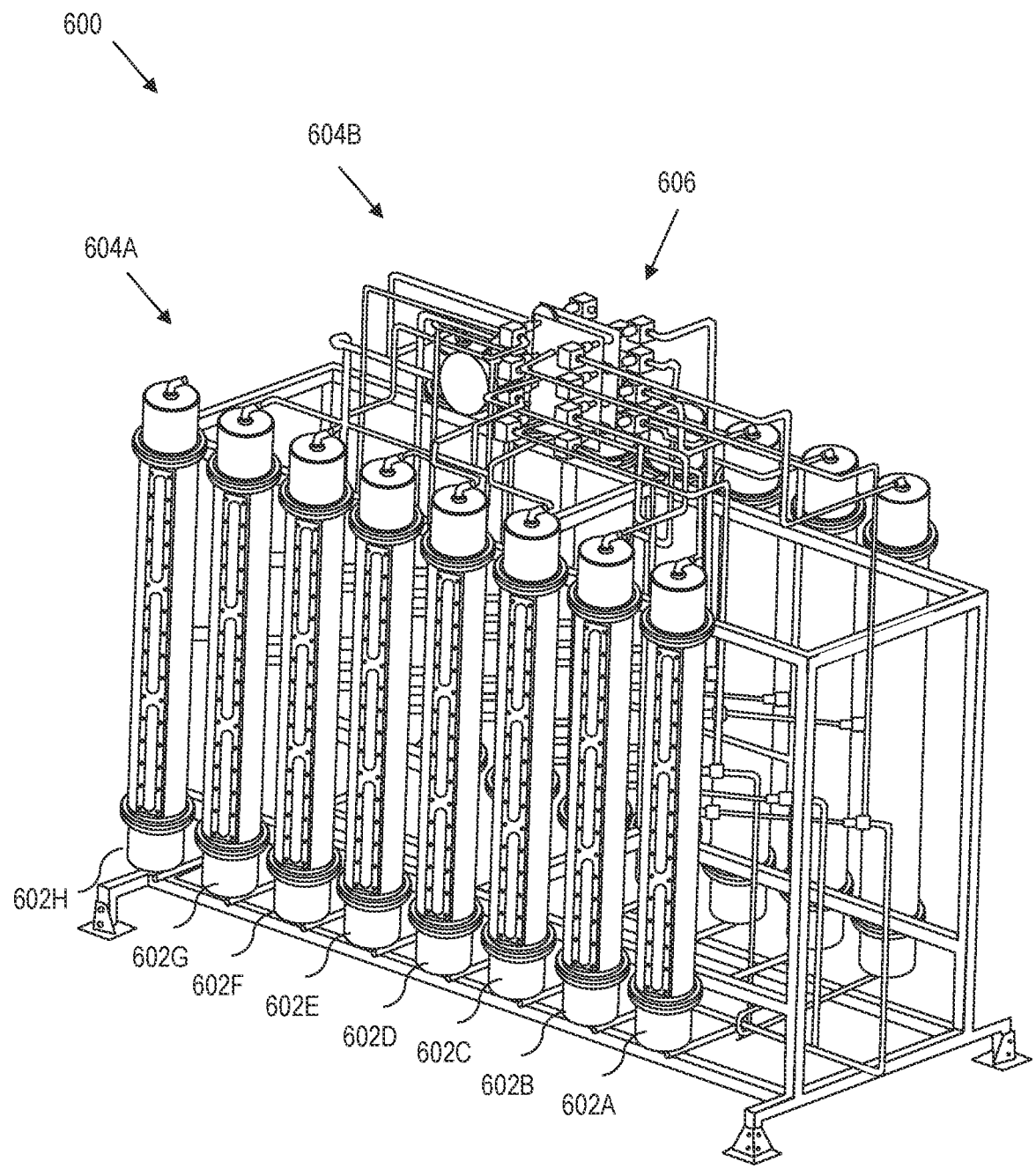
FIG. 6 is an example sixteen-stage liquid-liquid extraction unit, which can be utilized in the system of FIG. 1 and/or FIG. 2.
Figure 7:
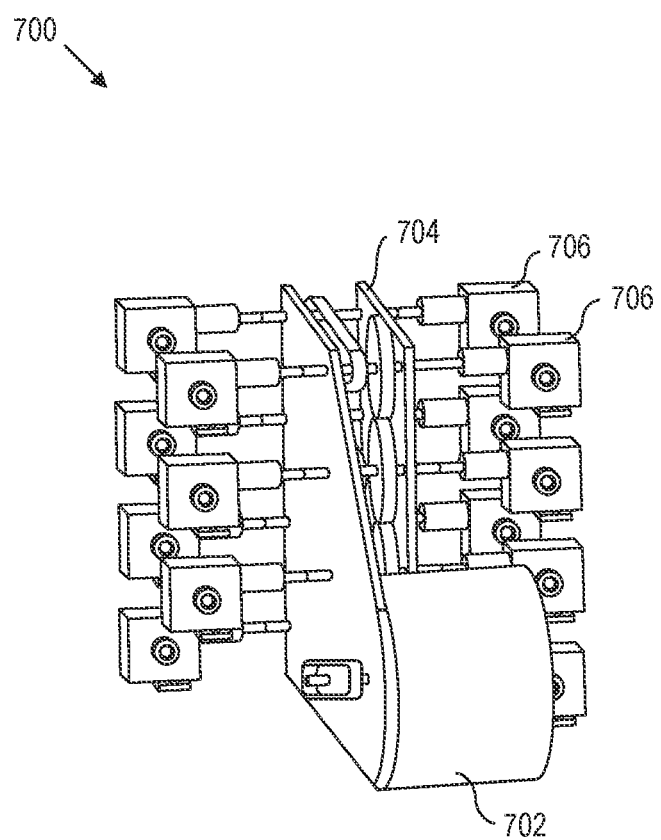
FIG. 7 is an illustration of certain aspects of a multi-head pumping system, which can function as part of a liquid-liquid extraction system, according to aspects of the present disclosure.

Referring briefly to FIG. 6, an example sixteen-stage liquid-liquid extraction system 600 is illustrated. The sixteen-stage version works analogously to the three-stage version described with reference to FIG. 5. However, the processing is extended out by the corresponding number of stages (i.e., from three stages (FIG. 5) to 16 stages (FIG. 6).

The system 600 includes sixteen liquid-liquid extraction process stages 602, which can be implemented in a manner that is analogous to the liquid-liquid extraction process stages 502 (FIG. 5). For instance, each stage can be implemented as a liquid-liquid extraction unit 122 (FIG. 1), liquid-liquid extraction unit 204 (FIG. 2), a liquid-liquid extraction process stage 402 (FIG. 4A), a liquid-liquid extraction process stage 402 (FIG. 4B), or a combination thereof. As such, the operation of each stage incorporates by reference, the preceding disclosure.

As illustrated, the system 600 is implemented as two "banks", including a first bank 604A and a second bank 604B. Each "bank" organizes eight liquid-liquid extraction process stages 602 each.

Each bank is analogous, so only the first bank 604A of liquid-liquid extraction process stages 602 is labeled. See stages 602A, 602B, 602C, 602D, 602E, 602F, 602G, and 602H.

Moreover, the system 600 illustrates a pump system 606. The pump system 606 controls the flow through the various liquid-liquid extraction process stages 602, and can be implemented by any combination of controls, motors, pumps, valving, etc. Examples that can be utilized with the system 600 are described in greater detail here in any combination thereof.

Thus, in some embodiments, the liquid-liquid extractor can be made up of separate (multiple) liquid-liquid extraction stages. One or more of the extraction stages can have one or more phase separators. Moreover, in the illustrated embodiments of FIG. 4A, FIG. 4B, FIG. 5, and FIG. 6, each stage is comprised of a static mixer followed by a separation vessel, which is optionally embedded with one or more phase separator(s) to force the separation of liquids. As illustrated in FIG. 4B, in some embodiments, one or more stages can also include a pump upstream of the associated static mixer. Configuring the vessels as separate units allows the phase separation to occur away from the phase mixing, e.g., to ensure complete phase separation. Also, configuring the vessels as separate units allows static mixing to be performed outside the vessel, e.g., to ensure optimal and effective mixing. Also, in some embodiments, the system can exhibit a counter flow of fuel and extraction solvent in the stages.

Extraction works effectively over a wide range of indoor and outdoor ambient temperatures, requiring no heating, no cooling, no enclosure, etc. Fast processing rates per square foot and/or small footprint can be realized, and, aspects herein are not limited by gravity separation.

In some embodiments, without hydrophobic phase separators, the separation step in the liquid-liquid extractor may only be achieved as long as the liquid velocity is below the "flooding velocity" (velocity at which liquid separation is not achieved, e.g., both phases may spray out the top of the column). The flooding velocity (velocity at which entrainment occurs) in a conventional liquid-liquid extraction vessel, without a phase separator, may be, for example, an order of magnitude lower than it is if a hydrophobic member, e.g., a hydrophobic membrane is installed therein. Thus, in some embodiments, including the phase separating membrane or other form of hydrophobic member, the liquid-liquid exchange herein can process significantly increased amounts of fuel, e.g., at least 10 times the amount of fuel in some embodiments, that could be processed without a corresponding membrane in the same size system, at the same conditions, without any additional modifications. The ability of processing at high liquid velocities enables the system to process large volumes of fuel with a small footprint.

When used for desulfurization, the extraction functions well over a wide range of temperatures, e.g., validated from −20 degrees fahrenheit to 125 degrees fahrenheit (approximately −28.8 to 51.7 degrees Celsius).

Moreover, by modifying the pressure, temperature, or both, processing and processing efficiency can be modified. For instance, by increasing pressure, temperature, or both, the number of stages may be reduced to achieve an equivalent sulfur reduction. In this regard, processing conditions can be controlled based upon desired desulfurization results.

The disclosed liquid-liquid extractor can be implemented via a simple and compact design, and is thus ideal for mobility and transportability. Moreover, as illustrated above, some embodiments are modular and scalable.

Desulfurization rates can range in example implementations, from 0.2 gallon hour to 250 gallon/hour or more.

Moreover, example liquid-liquid extractors can work on minimal energy requirements, operate at room temperature and pressure, with no exotic materials, and no need for ionic liquids as an extractant.

The sulfur-carrying impurity molecules in fuels are sulfided hydrocarbons, having weak polarity ranging from non-polar to mildly-polar. Their weak polarity makes it difficult to separate them on the basis of polarity from the non-polar hydrocarbons that mainly comprise fuel. Therefore aspects herein employ oxidation as a preparatory step to increase the polarity of the impurities to allow for deeper desulfurization in the subsequent extraction step.

Moreover, in some embodiments herein, a mixing process is performed outside the separation vessel. Also, each separation stage is separated from the next to form individual separation vessels.

Multi-Head Pumping System

Chemical and physical processes can consist of multiple process steps, requiring multiple process units arranged in series. Additionally, some processes require multiple stages per unit to increase the process efficiency and further refine the product. Examples of multistage processes include filtration, flash distillation, multistage liquid-liquid extraction and more. In order to ensure accuracy in delivering equal flow rate in and out each process unit or stage, one (feed), two (feed and discharge) pumps, etc., can be utilized. Moreover, process instrumentation can be utilized to control the flow in and out of the process units or stages. Examples of instrumentation used to control flow include flow sensors, flow meters, control valves, pressure regulators, etc. Typically, more than one instrument is combined in series to control a process unit.

Adding instruments to each process unit (or to each stage) adds significant procurement cost, operational complexity, maintenance cost, calibration requirement, and repair downtime. It also requires having tens or hundreds of spare parts. However, according to aspects herein, a single pumping station can be provided, that can serve more than one process unit or the needs of a multistage process unit, while ensuring equal flow rates in all lines.

Referring generally to FIG. 7, FIG. 8A, FIG. 8B, and FIG. 9, for instance, a pumping system 700 is illustrated, which can be used with any combination of features described herein. The example pumping system 700 is comprised of a one large motor 702, a power transmission system 704, and multiple pump heads 706. In an example configuration, a multi-head pump assembly is driven by a single motor 702 that is coupled to the power transmission system 704 (implemented as a gearbox, belt and pulleys, chain and sprockets, etc.), which transmits power mechanically from shaft to shaft, so as to provide consistent, equal flow from one extraction stage to the next extraction stage (e.g., extraction stages described previously, e.g., with regard to FIG. 4A, FIG. 4B, FIG. 5, FIG. 6, and otherwise discussed herein). That is, the single motor drives multiple pump heads for equal flow from one extraction tower (liquid-liquid extraction stage) to the next. In an example embodiment, the number of utilized pump heads is equal to the number of required extraction stages.

In an example implementation, the gearbox 704 has a number of gears that is equal to the number of shafts required for the process of interest. In example embodiments, all gears can be of the same size and may be identical. For other applications, gears could be different in size and number of teeth. The gearbox 704 transmits the motor shaft power to all peripheral shafts, at same rotational speed and direction. Each peripheral shaft carries a rotary pump head 706 that rotates at the same rotational speed and direction. The gearbox 704 is configured as required by the most suitable configuration for the application. For instance, every gear can be interconnected with a following gear to transfer the shaft work.

Figures 8A, 8B:
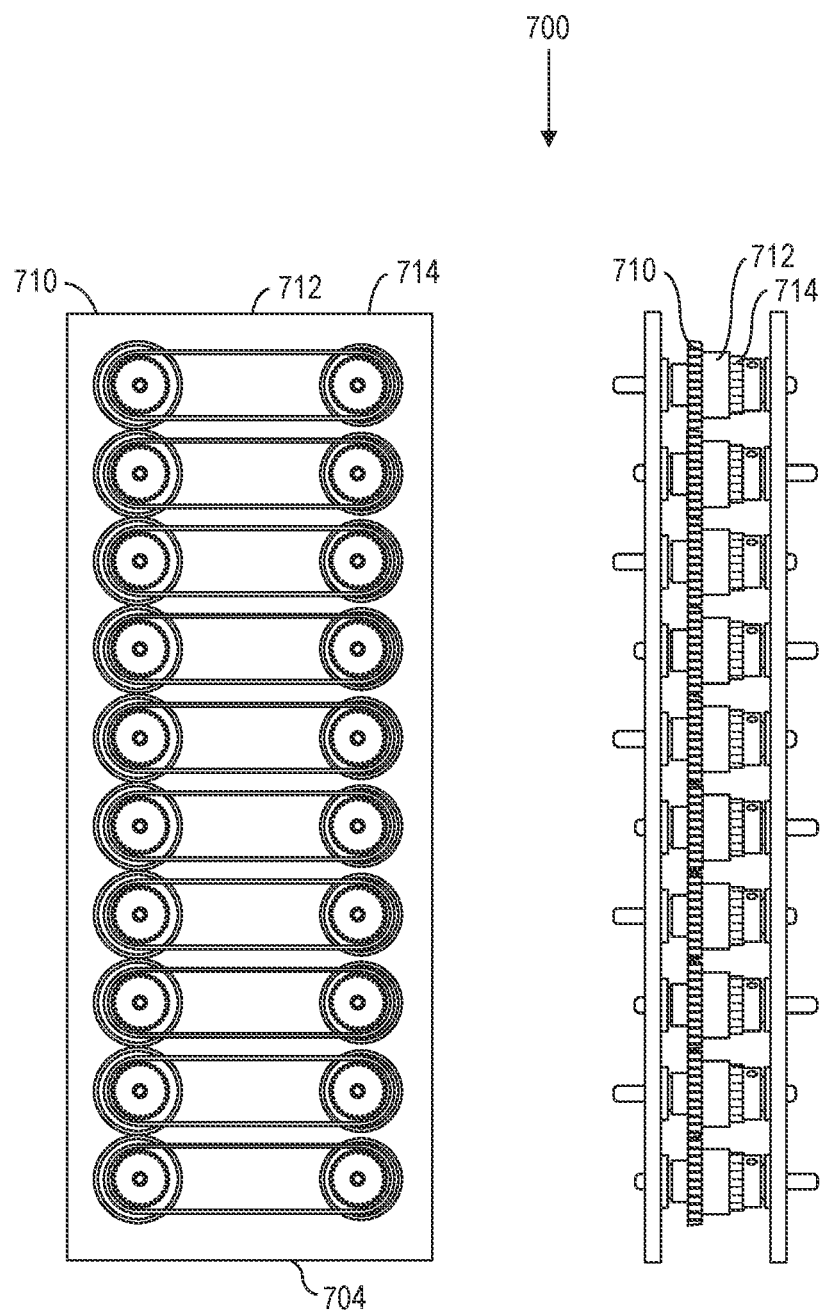
FIG. 8A is an illustration of additional aspects of a multi-head pumping system, which can function as part of a liquid-liquid extraction system, according to aspects of the present disclosure.
FIG. 8B is a side view of the aspects of FIG. 8A, according to aspects of the present disclosure.
Figure 9:
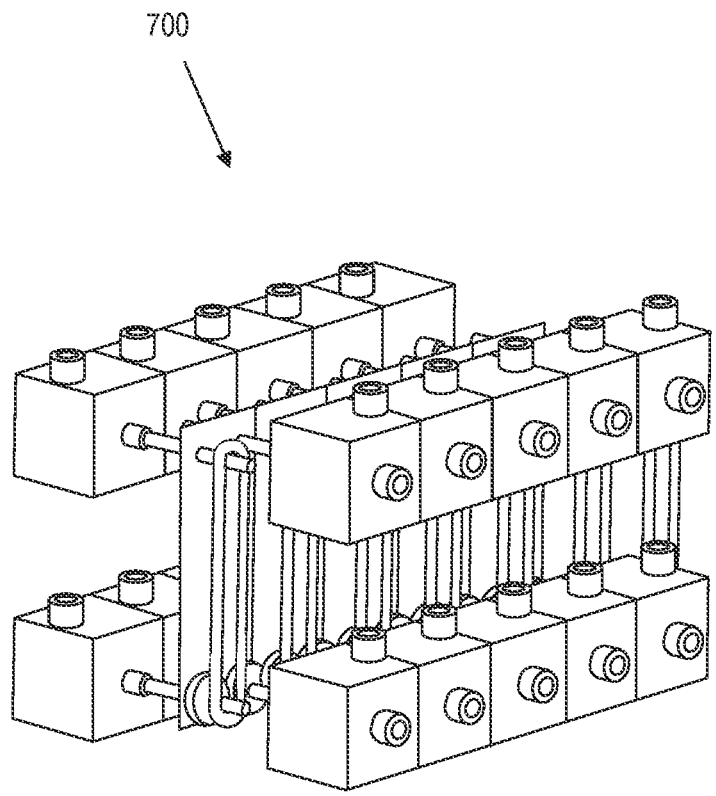
FIG. 9 is an illustration of yet additional aspects of a multi-head pumping system, which can function as part of a liquid-liquid extraction system, according to aspects of the present disclosure.

Referring generally to FIG. 8A and FIG. 8B, as an example, pulleys 710 and belts 712 can be used to transfer shaft work in each row between two gears 714. Shafts can be made available on two faces of the gearbox 704 in order to maintain same rotational direction.

In yet another example embodiment, a power transmission system utilizes chains and sprockets to transfer the power from the motor to the shafts to rotate the pump heads.

Figure 10:
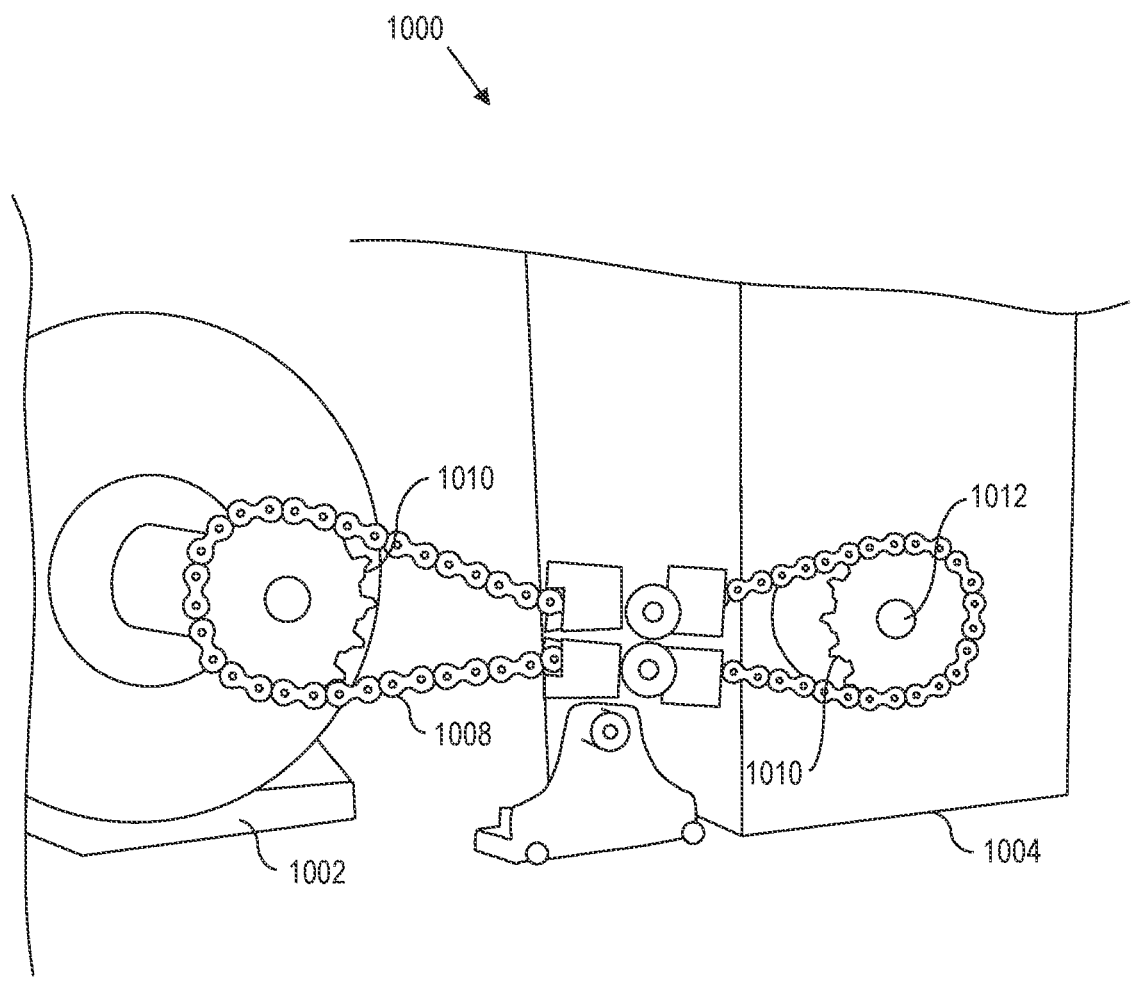
FIG. 10 schematically illustrates a chain drive pump system according to aspects of the present disclosure.
Figure 11:
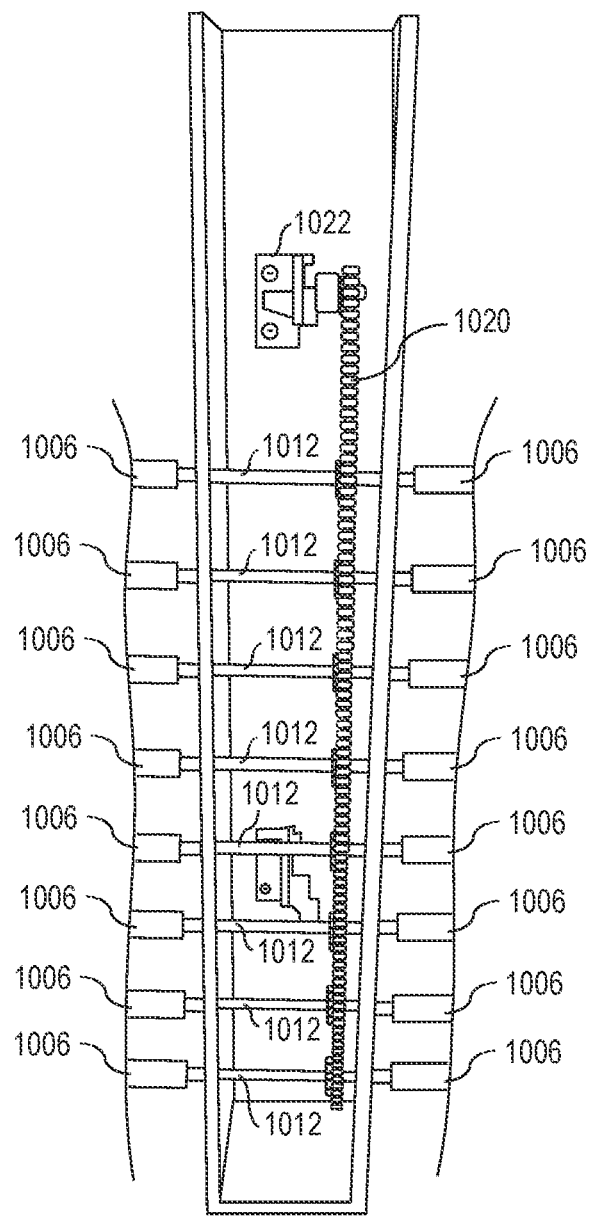
FIG. 11 schematically illustrates another view of the chain drive pump system of FIG. 10.
Figure 12:
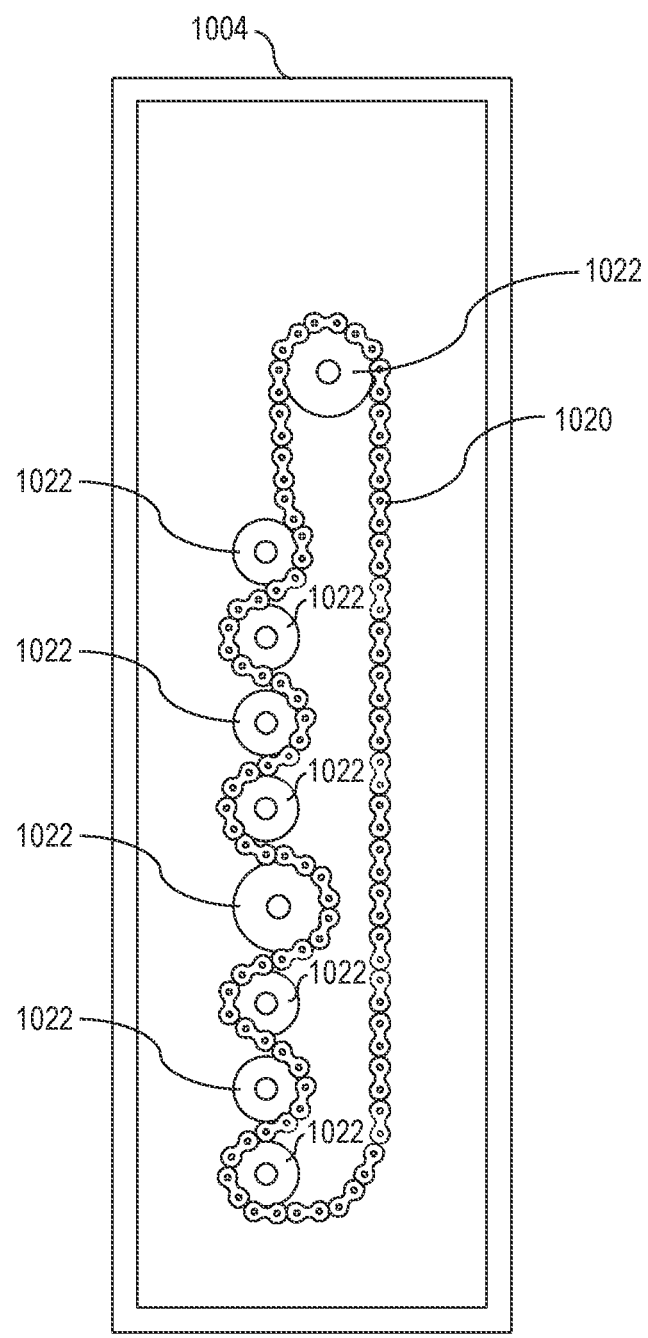
FIG. 12 schematically illustrates yet another view of the chain drive pump system of FIG. 10.

Referring generally to FIG. 10, FIG. 11, and FIG. 12, another example configuration of a power transmission system is illustrated. Analogous to FIG. 7-FIG. 9, the example pumping system 1000 can be used with any combination of features described herein. The example pumping system 1000 is comprised of a one large motor 1002, a power transmission system 1004, and multiple pump heads 1006.

As illustrated in FIG. 10, a first chain 1008 is utilized to couple power from the motor 1002 to the power transmission system 1004, e.g., via sprockets 1010. In the illustrative example, the sprocket 1010 on the power transmission system 1004 is coupled to a shaft 1012 that couples power to pump head(s) as best illustrated in FIG. 11.

Referring generally to FIG. 11 and FIG. 12, the power transmission system 1004 couples power to the pump heads 1006. An example of the power transmission system 1004 is illustrated in greater detail. Notably, the gearbox of the previous embodiment is replaced with a second chain 1020 (e.g., a drive chain), and sprockets 1022.

This approach may result in a simpler and less expensive configuration, e.g., compared to the use of a gearbox.

In this configuration, the second chain 1020 and two sprockets 1022 are utilized to transmit power from the motor 1002 (FIG. 10) (which is connected to one of the shafts 1012 of the multi-head pumping system as illustrated in FIG. 10. The second chain 1020 transmits power from the same shaft 1012 to all of the shafts carrying the pump heads 1006 (each shaft has a sprocket 1022). The second chain 1020 can run, for example in serpentine shape between the shafts to have a good traction, as best illustrated in FIG. 12.

Of course, any combination of gearbox(es), belts and pulleys, chains and sprockets, etc., can be utilized, depending upon the specific configuration.

There are a number of advantages of certain configurations herein. A multiple-head pump can be used to deliver or transfer a single process fluid from a common vessel through multiple independent lines.

A multiple-head pump can be used to deliver or transfer any number of different process fluids from and to individual vessels, e.g., each through an independent line.

Also, a multiple-head pump eliminates the need to employ multiple individual motor-pump systems for each transferring line, as one motor can be used to move the process fluids in each line.

If similar pump heads are used, the process fluids are transferred with the same flow rate, eliminating the need of flow controllers in each line. The motor speed sets a common flow rate for all pumps. On the other hand, if different flow rates are required, a different pump head can be installed for the specific transferring line.

The compact configuration reduces significantly the footprint required for the pumping system.

A wide range in the number of pumping heads can be accommodated in this design. For example, a desulfurization system described herein can use twenty pump heads (or other number of pump heads).

Maintenance operations and costs also benefits from this configuration. For instance, in practical applications, a malfunction of a specific pump head does not interrupt the operations of the other pumps, and a malfunctioned pump head can be replaced in a timely manner without a significant disruption of the overall process.

In an example embodiment, all internal parts of the gearbox are same in sizes according to their own category. Thus, a spare replacement can be easily stocked and make available to reduce maintenance time.

Solvent/Sulfur/Hydrocarbon Separation Process Unit (Process Unit 3)

The extraction solvent leaving the liquid-liquid extraction unit needs to be cleaned up then recycled in order to be used in further extractions.

As noted above, in certain example embodiments disclosed herein, the solvent/sulfur/hydrocarbon separation unit consists of a distillation column (see for example, 128, FIG. 1), phase separation vessel (see for example, 134, FIG. 1) and a sorbent bed or a filter. In the distillation unit, the solvent, which is the lightest component, is distilled to be separated. Water could also be distilled leaving only the higher boiling point aromatics and sulfones in the bottom of the distillation. Solvent, and water if distilled, are to be sent back to the liquid-liquid extraction unit for re-use.

The bottoms of the distillation unit that contain all of the high boiling point aromatics and sulfones (and may or may not include water) exit from the bottom of the distillation column to enter an oil/aqueous separating vessel in which the sulfones and aromatics form a separate layer and separate from the water.

A hydrophobic membrane may be placed near the top of the phase separating vessel forcing the separation of the sulfones and aromatics (the oil phase) from the water-rich phase. Or a oleo-phobic, hydrophilic membrane can be placed down in the vessel to only allow the water to pass and separating the oil from any water. The oil phase exiting the top of the oil/aqueous separator will be used in an oil-fired steam generator to contribute the energy required for distillation and eliminate waste. The solubilized hydrocarbons carried by the water exit the bottom of the oil/aqueous separator, then is sent to a filter or a sorbent bed to remove the hydrocarbons solubilized in water. This allows water recycling.

Distillation-Based Solvent/Sulfur/Hydrocarbon Separation Example

Figure 13:
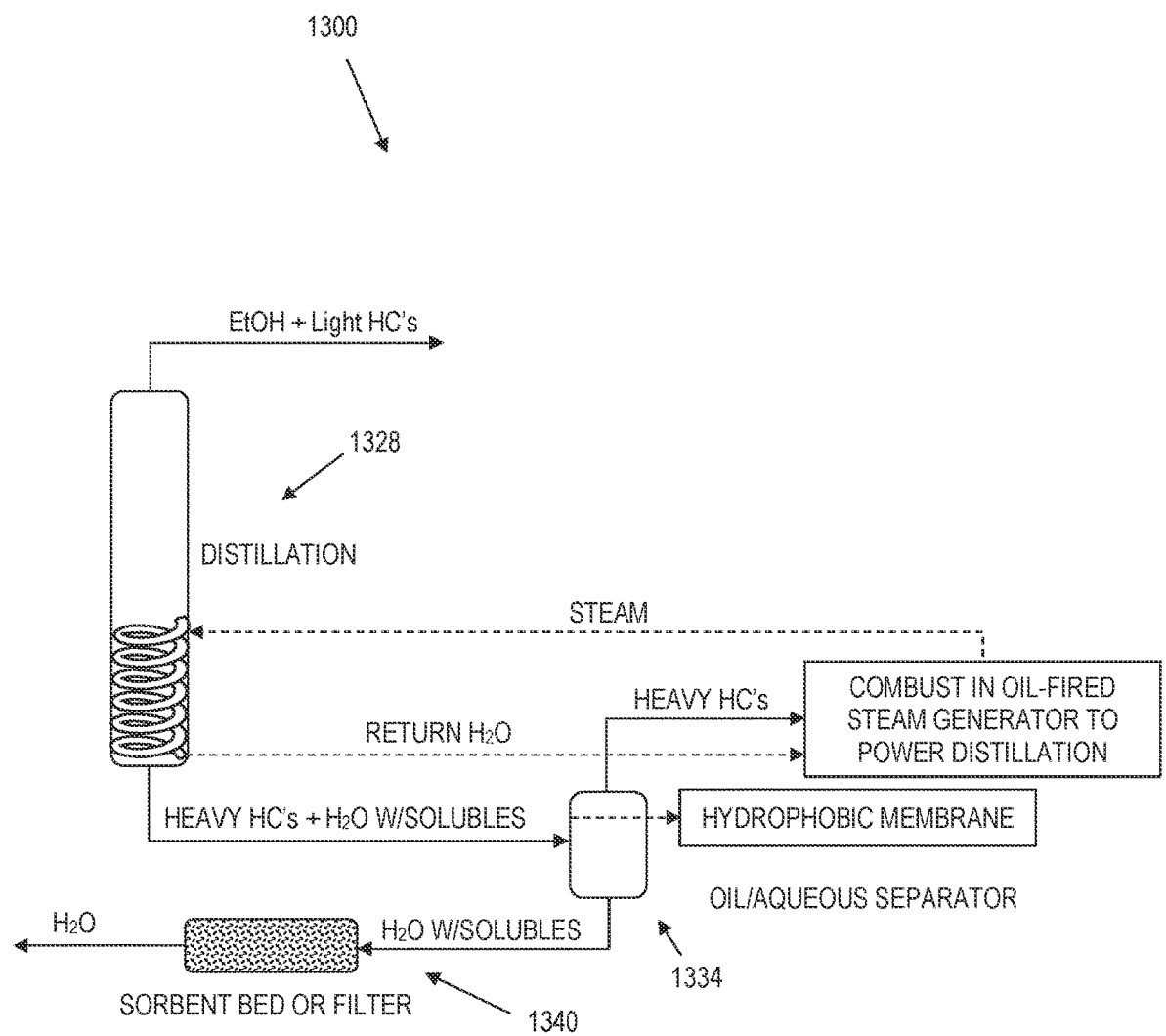
FIG. 13 is an illustration of an example solvent/sulfur/hydrocarbon separation processing unit, which can function as part of a liquid-liquid extraction system, according to aspects of the present disclosure.

There are multiple example ways of cleaning the extraction solvent, including distillation and adsorption. FIG. 13 illustrates the layout of an example distillation-based solvent/sulfur/hydrocarbon process unit 1300.

Referring to FIG. 13, the process unit 1300 includes a solvent/sulfur/hydrocarbon separation process unit 1328, an oil/aqueous phase separator 1334, and a filter 1340. The process unit 1300 can represent an example embodiment of the combination of the solvent/sulfur/hydrocarbon separation process unit 128, oil/aqueous phase separator 134, and filter 140, (FIG. 1), and as such, like elements are illustrated with reference numerals 1200 higher in FIG. 13 compared to FIG. 1. In this regard, the corresponding description of such like elements is incorporated from FIG. 1 into the discussion of FIG. 13.

In example embodiments, the liquid-liquid extraction process, ethanol based extraction fluid can perform well, with only a slight decrease in sulfur removing power after multiple reuses/passes. For instance, multiple passes, e.g., three passes, can be achieved without the need of removing the impurities. This helps keep the amount of aromatic compounds that get extracted at a minimum at saturation limit. Eventually however, the extraction fluid needs to be purified for further use.

In the example illustrated, the solvent/sulfur/hydrocarbon separation unit 1328 consists of an atmospheric distillation column. The phase separator 1334 is implemented as a phase separating vessel. The filter 1340 is implemented as a sorbent bed.

In the distillation unit, the ethanol, which is the lightest component, is distilled to be separated from water, which contains the higher boiling point aromatics and sulfones. Water, high boiling point aromatics and sulfones exit from the bottom of the distillation column to enter the phase separator 1340, e.g., an oil/aqueous separating vessel in which the sulfones and aromatics form a separate layer and separate from the water.

The phase separator 1340 includes a hydrophobic member, e.g., a hydrophobic membrane, a disk made of hydrophobic material, etc., placed near the top of the phase separating vessel forces the separation of the sulfones and aromatics (the oil phase) from the water-rich phase. The oil phase exiting the top of the oil/aqueous separator can be used in an oil-fired steam generator to contribute the energy required for distillation and eliminate waste. That quantity of hydrocarbon soluble carried by the water first exits the bottom of the Oil/Aqueous separator and is then sent to an activated carbon or silica gel bed to remove water soluble hydrocarbons. This allows water recycling.

As illustrated throughout this disclosure, the design, selection, and arrangement of the process sub-units provides a fuel desulfurization process that can have zero to low waste, minimizing cost and logistics of disposal.

In some embodiments, the design and arrangement of the process sub-units of the solvent/sulfur/hydrocarbon separation unit allows for product separation while eliminating or at least reducing waste streams. The process is designed so that the distillation byproducts, including sulfur-carrying hydrocarbons, can be combusted, e.g., to power the distillation column that separates the solvent from other extracts, and can be used to reclaim and recycle the solvent. Heavy fuel components can be combusted to provide a portion of the energy required by the distillation unit. Aqueous phase merges with a recycled ETOH stream to re-adjust the solvent composition.

Mobile System

Figure 14:
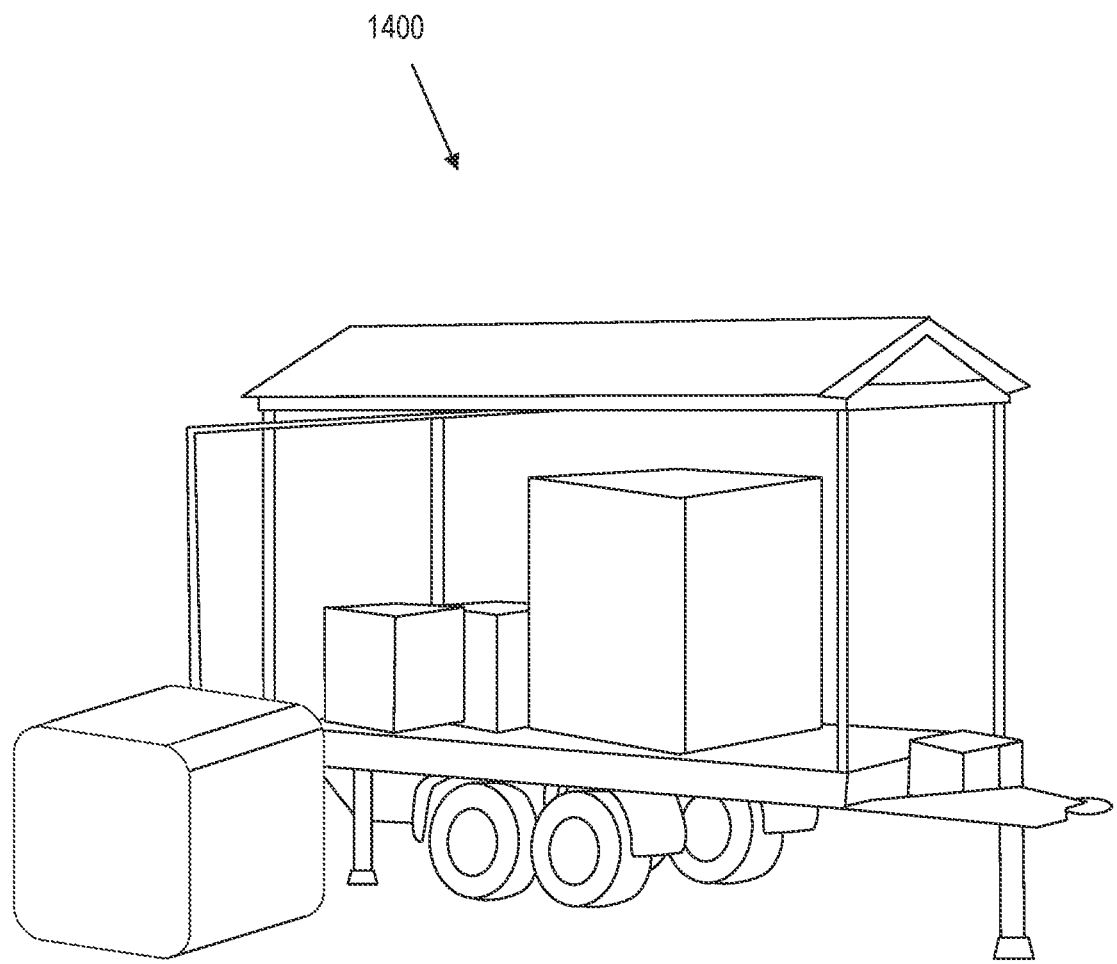
FIG. 14 is an illustration of a mobile implementation of the system of FIG. 1.

Referring to FIG. 14, aspects herein are configured as a deployable system 1400 to remove sulfur impurities from a tank, e.g., a tank of locally-procured impure fuel. The system 1400 can comprise any combination of tanks, valving, pumps, components, structures, and processes described more fully herein, packaged in a portable form factor.

Analogous to that described more fully herein, the system in FIG. 14 can efficiently remove sulfur-containing impurity molecules from hydrocarbon liquid fuels ('desulfurization') in continuous flow, using a closed-loop arrangement that recycles the solvent that is used to extract the sulfur. As a result, very low sulfur impurity concentrations ('deep desulfurization') can be achieved, even in point of need applications, to desulfurize significant amounts of fuel. According to some embodiments, oxidative desulfurization ('ODS') and enhanced liquid-liquid extraction function in tandem, so as to achieve deep desulfurization.

Although illustrated in FIG. 14 as removing sulfur from a tank at a source, aspects herein can be used to remove sulfur impurities, aromatics, and other organic contaminants from sources, such as fuels, organic solvents and other non-polar compounds.

In this regard, aspects herein are useful to desulfurize high sulfur fuel, e.g., for ground equipment and vehicles at a point of need.

Non-Sulfur Example

Aspects herein are not limited to desulfurization of fuel. In this regard, the systems herein can be adapted and expanded to alternative configurations, e.g., for pharmaceutical, manufacturing, chemical processing, etc. As an illustrative example, the liquid-liquid extraction can be manipulated to process a liquid having an undesirable component at an unacceptable level to be reduced.

By way of example, a liquid-liquid extraction system can comprise at least one liquid-liquid extraction stage. Here, like the sulfur fuel example, each liquid-liquid extraction stage comprises a mixer and a separation vessel coupled to the mixer, e.g., analogous to that shown in FIG. 4A and/or FIG. 4B. The mixer mixes a liquid having an undesirable component at an unacceptable level to be reduced, with an extraction fluid, and an output of the mixer is fed to the separation vessel. Separation within the separation vessel (e.g., phase separation) separates the liquid mixed with the extraction fluid into liquid having a reduced level of the undesirable component, and a residual that includes the undesirable component removed from the fluid. The liquid having the reduced level of the undesirable component exits the separation vessel at a first output (e.g., the top of the vessel) and the residual exist the separation vessel at a second output (e.g., the bottom of the vessel). Here, the extraction fluid is selected so as to mix with the fluid and to pull at least a portion of the undesirable component from the fluid. In this regard, stages can be cascaded (e.g., analogous to that shown in FIG. 5) to decrease the overall level of the undesirable component in the fluid to a desirable level. In this regard, systems and components illustrated in FIG. 6-14 can be adapted to the fluid using concepts analogous to that described herein, but adapted to the fluid and the undesirable component within the fluid.

Example Applications

By way of illustration, aspects herein can be used at a point of need to desulfurize in small to moderate volumes (e.g., 100 to 10,000 gallons per day), fuels obtained through normal distribution channels that do not meet established sulfur impurity requirements, e.g., sulfur impurity requirements of United States and/or European specification. As noted more fully herein, an ultra-low sulfur (ULS) specification may require that a sulfur impurity level must be at or below 15 parts per million (ppm) by weight. Thus, fuel can be provided for diesel-powered equipment when and where the required fuel quality is not available. Moreover, in some embodiments, the disclosed system provides sulfurizes fuel while keeping all other fuel properties within specifications.

For example, currently, ultra-low sulfur fuels are produced at petroleum refineries using 'hydrodesulfurization' (HDS) infrastructure, which is necessarily massive in scale and cost. Because comparable ultra-low sulfur requirements are not always required in third-world regions, HDS refinery investments may have not been made. Equipment types requiring such fuels include ground power generators, and diesel-engine cars and trucks.

As another example, aspects herein can be used for desulfurizing diesel and jet fuels to power fuel cells, e.g., deep desulfurization of JP-8 fuel for fuel cells use.

Other Uses

Aspects herein are not limited exclusively to desulfurization. For instance, Process Unit 2 and/or Process Unit 2 in combination with Process Unit 3 can be utilized to process liquids where extraction, separation, solvent recovery, combinations thereof, is required. Liquid-liquid extraction, optionally followed by solvent recovery does not have to be desulfurization or even a fuel-related application. As an example, liquid-liquid extraction and/or solvent recovery as described herein, could be used in an application in the pharmaceutical/chemical industry, etc.

Fuel Cells

Fuel cells, which convert hydrogen or other hydrocarbon fuels to electrical energy, are an increasingly common power source. One example fuel cell configuration is a solid oxide fuel cell (SOFC), which uses hydrogen as its fuel source after deriving it from liquid hydrocarbon fuels. To be used in fuel cells, petroleum fuels must first pass through a catalytic process known as reformation, which is carried out in a device known as a fuel reformer. Unfortunately, the reformer and the fuel cell are intolerant to the sulfur impurities and aromatics in petroleum fuels. Therefore, medium to large-scale fuel desulfurization systems described herein, can be extremely useful for reducing the removing both sulfur and aromatics before entering the reformer, allowing for longer, reliable operation of the fuel cell.

Moreover, fuel cell technology is an increasingly important means of producing emergency backup electrical power at large institutions such as hospitals and government installations, and as a primary power source in third-world regions.

Fuel cells are also an important source of electrical energy for vehicle applications including ground vehicle propulsion, UAVs, on-board electronics power, and others.

As yet another illustrative example, aspects herein can be used to improve fuel energy content by removing aromatics in addition to and/or in alternative to sulfur.

Aspects herein can be used to reduce or remove entirely, the aromatic portion of liquid fuels so as to increase the relative concentration of the aliphatic portion of the fuel required by a combustion engine (e.g., a piston engine), to thereby increase the fuel energy content and the range and linger time of the vehicle.

Aspects herein can also remove aromatics from aircraft fuels to improve turbine engine overhaul intervals. Soot formation significantly shortens the engine overhaul interval requirement. However, aspects herein can be used to reduce or remove entirely, the aromatic portion of liquid fuels to decrease the soot formation in turbine engines.

Aspects herein can also be utilized for local fuel desulfurization for international commercial aviation (passenger and freight). Various regulations may restrict the allowable sulfur levels in domestic aviation fuels, and constrain the configurations of aircraft engines accordingly. International commercial aviation flights may thus face the need to re-supply with out-of-spec Jet fuels. Thus, major airlines may deploy desulfurizing rigs as described more fully herein, and incorporate them into their fueling apparatus at international airports.

Still further, aspects herein provide on-board fuel desulfuring equipment, e.g., for international commercial shipping (freight and passenger). For instance, future regulations may restrict the allowable sulfur levels in domestic marine fuels and constrain the configurations vessel engines. Commercial ships on international cruise lines may be forced to re-supply with out-of-spec marine fuels. Thus, vessel manufacturers may incorporate desulfurizing technology as described herein, directly into the design and construction of vessel propulsion units. Fuel desulfurizing technology as described herein can be fitted, for instance, in a ship's engine room to process the fuel before the fuel enters a corresponding engine.

As yet another example, during and after a major natural disaster (hurricane, earthquakes, tornadoes, etc.), affected areas quickly run out of low sulfur diesel required for the emergency power generators, due to the sudden spike in demand. This deployable, mobile desulfurizing system would be installed at the point of need, to desulfurize aviation fuels, which are typically available in large quantities but are inherently high in sulfur content.

Miscellaneous

Aspects herein can be economically designed and manufactured at moderate scale so as to process substantial amounts of fuel while remaining small and light enough to be easily transported to the point-of-use, where the system can be easily installed. Moreover, aspects can be designed and manufactured at yet smaller scale so as to be directly incorporated into, for instance, an engine equipment system. The process is carried out at or near ambient temperature and pressure, therefore having a minimum energy requirement and being safe and simple to operate and straightforward to incorporate directly into engine systems. System configurations herein use relatively small amounts of consumables that are commonly available, so that the logistical burden and costs for continuous operation are reasonable.

For instance, to desulfurize high sulfur fuel for ground equipment at a point of need, a first example of a current approach comprises Refinery-based desulfurization (Hydro-Desulfurization, HDS). HDS requires large amounts of H2, high temperature, high pressure, and a catalyst. As such, HDS works for large-volume production at large refineries but is limited in small to medium scale desulfurization due to high cost, and poor product quality in third-world/austere regions. Comparatively, systems described herein are deployable so as to have a small footprint, provide mobility, low operational cost, and scalability to meet moderate volume requirements.

In addition to the need for massive infrastructure, HDS is inefficient for the removal of certain problematic sulfur compounds, thus very expensive for achieving deep desulfurization. Thus it is neither practical nor economical to construct point-of-use HDS units at scale smaller than that of a refinery. Instead, specification fuels are produced at the refinery and shipped to the point of need.

As another example, adsorptive desulfurization is conceptually simple, but unwieldy in size and weight, creating challenging logistics, and high operational costs.

For instance, adsorptive technologies suffer from high sorbent costs and low efficiency (ratio of mass of sulfur removed to the mass of sorbent), therefore requiring large quantities of sorbent for continuous flow operation. This in turn, requires multiple, large-sized sorbents beds, which makes the process less portable. Also, pressure swing adsorption is not effective due to the strong interaction of sulfur with the adsorbent. Large adsorbent beds are, therefore required to minimize the number of turnovers required, and multiple beds are needed to keep a refinery on-stream, which requires major capital investments, enlarging the system footprint and makes it less deployable. Sorbent regeneration is logistically difficult and costly, because of the need for solvents for washing, and because of the high temperature/energy requirement calcinations. Repeated calcinations can also lead to a loss of surface area due to sintering, thus compromising the amount of sulfur a bed can remove. $H_2O_2$ is the most commonly used oxidant in research.

Comparatively, systems herein are technologically distinct from the adsorptive desulfurizing approach, provide reduced logistic burden and operational cost, and are scalable to meet size requirements. For instance, aspects disclosed herein are favorable for on-board fuel cell reformers in terms of transportability, suitability for integration with on-board Fuel Cells, provide excellent characteristics in ambient operation, and good performance in consumable burden/cost.

As still another example, conventional oxidative desulfurization ('ODS') provides unacceptable impurity levels. Comparatively, systems disclosed herein are capable of producing specification fuels.

Conventional ODS is an effective desulfurizing method that pairs oxidation with impurity extraction by a solvent. However, as currently practiced, ODS suffers problems with the purity of the processed fuel, and by the performance of the specific solvents used.

The oxidation process is inherently not selective to sulfur. As such, undesirable byproducts are produced and must be removed by solvents. In some ODS practices, the solvents are not powerful enough to effectively remove all of the sulfur impurity or the other, undesirable byproducts. When stronger solvents are used, the solvents themselves sometimes remain in the fuel, thereby becoming a new impurity. In other practices, strong solvents remove some of the desirable components of the fuel. Some common water-soluble polar solvents employed are dimethyl sulfoxide (DMSO), dimethylformamide (DMF), acetonitrile, etc. The former two solvents have a high extractability for sulfones but also have a high boiling point (573 K). This is close to the boiling point of the sulfones, which is problematic for solvent separation and recycling. Ionic liquids (ILs) are also used as solvents. Ionic liquids (ILs) are organic salts having melting point below 100 C that are composed of organic cations and organic/inorganic anions. Instability of the ionic liquids, the need for regeneration, corrosion problems, negative effects on fuel quality, and high material costs make the use of ionic liquids less than desirable on industrial scale.

Comparatively, aspects disclosed herein provide an impurity-free fuel that meets necessary specifications using a solvent that does not bring the above problems.

Aspects disclosed herein can be scaled down to relatively smaller bench-scale and pilot-scale applications, and can operate at ambient and near ambient temperature and pressure. However, if distillation is selected for solvent recovery, the distillation may occur at elevated temperatures. Aspects herein have a relatively modest footprint, and can produced relatively large volumes of desulfurized fuel. For instance, an example implementation can routinely achieve good performance on many different types of diesel and jet fuels having initial sulfur impurity levels ranging from 300 ppm to 2200 ppm, typically producing an ending sulfur level below 10 ppm.

Observations

The claimed invention can include or be amended to include the liquid-liquid extraction unit alone, e.g., to extract liquids in applications where an oxidation processing unit and/or separation processing unit are not strictly required. As such, any combination of features described in the detailed description herein with reference to process unit 2, a liquid-liquid extraction unit, a liquid-liquid extraction stage, a liquid-liquid processing unit 122 of FIG. 1, extraction unit 204 of FIG. 2, FIG. 4A, FIG. 4B, FIG. 5, or FIG. 6 can be claimed alone or in combination.

Similarly, the claimed invention can include or be amended to include a multi-head pumping system alone. For instance, the multi-head pumping system may be deployed outside the context of the desulfurization system herein. In this regard, any combination of features described in the detailed description herein with reference to a pumping system, FIG. 7, FIG. 8A, FIG. 8B, FIG. 9, FIG. 10, FIG. 11, or FIG. 12 can be claimed alone or in combination.

Yet further, the claimed invention can include or be amended to include a solvent recovery system alone, e.g., in applications in applications where an oxidation processing unit and/or liquid-liquid extraction unit are not strictly required. In this regard, any combination of features described in the detailed description herein with reference to solvent recovery, a sulfur/hydrocarbon separation process unit, any combination of 128, 134, 140, etc., of FIG. 1, separation process 206 of FIG. 2, FIG. 13, can be claimed alone or in combination.

Also, the claimed invention can include any combination of the above-three innovations (liquid-liquid extraction, multi-head pumping system, and solvent recovery) alone, or in any combination of features set out herein. Still further, the claimed invention can include any of the above features in any combination with an oxidation process (e.g., 112 of FIG. 1, 202 of FIG. 2, FIG. 3), e.g., to implement a desulfurization system or other liquid processing system.

Coupling the rapid liquid-liquid extraction unit (process unit 2) with an oxidation reactor (process unit 1) provides unmatched rapid and powerful deep fuel desulfurization process.

When coupling the rapid liquid-liquid extraction unit (process unit 2) with an oxidative desulfurization reactor, this system provides a powerful and effective way for desulfurizing liquid fuel. In some embodiments, these two components alone can provide the fuel desulfurization process. However, in order to make the process economical and viable, a solvent recovery system can be incorporated.

Systems herein can operate effectively at ambient temperature, and at or near atmospheric pressure.

Aspects herein, incorporating one or more features, systems, processes, components, processing units, etc., can be combined into a closed-loop rapid, liquid-based petroleum fuel desulfurization technology.

The three process units described herein (with or without the multi-head pump), in combined use, can implement a rapid, mobile liquid-based petroleum fuel desulfurization process technology. The combined use provides deep desulfurization with rapid, closed-loop, deep desulfurization of petroleum liquid fuels, and effective desulfurization at substantial product rates with a small footprint configuration. The desulfurization rate is not limited by rate of gravity separation. This feature makes this technology ideal for at point-of-use desulfurization. Aspects can also be extended to liquids other than fuels, e.g., to separate unacceptable levels of a component of interest.

As noted more fully herein, in some example embodiments, fewer than twenty stages of extraction may be required to achieve deep desulfurization from diesel and jet fuels with sulfur levels up to 2200 ppm. This allows a system of relatively low size and weight relative to the desulfurization volume capability. For instance, systems herein can achieve moderate-volume, moderate-rate desulfurization (500-10,000 gallons per day (GPD)) at ambient conditions to produce fuels that meet chemical and physical properties required but current equipment.

In some embodiments, the deep desulfurization process operates in continuous closed loop, not batch. The loop can have any combination of three primary steps/subsystems: An oxidation step; a (optional multistage) liquid-liquid extraction step; and, a step to remove sulfur and hydrocarbon from the solvent in a way that produces zero hazardous waste or byproduct requiring disposal.

According to further aspects of the present disclosure, systems and processes are provided, that produce no undesirable byproducts. In this regard, a controlled method of fuel desulfurization is disclosed that utilizes Oxidative Desulfurization yielding required sub 15 PPM of sulfur while maintaining gum levels within the jet fuel gum specifications 7 mg/10 mL.

Also, aspects herein result in minimal, undetected amounts of oxygenates. The product fuel can meet composition and property specification requirements of diesel fuel for ground equipment and vehicles.

Yet further, aspects herein can scale up-and-down. The size of the system can be scaled up or down to meet specific production rate requirements.

Yet further, aspects herein inherently eliminate hazardous waste and byproducts. The potentially hazardous byproducts of extraction fluid cleanup, i.e. sulfur-carrying fuel components and aromatics, are re-purposed as fuel for the extraction fluid cleanup heating device.

Still further, aspects herein require only small amounts of consumables, and use benign extraction solvent. The desulfurization process can use, for example, relatively ubiquitous and safe consumables, such as ethanol 140 as a solvent (non-denatured or denatured) in its liquid-liquid extraction, which can easily be denatured if desired.

Depending on the feed and the required product specifications, several process design variations may be implemented. These variations may include, for example, the addition of a fuel preparation step prior to oxidation (e.g. rinse), as well as changes to the type of oxidant, oxidation reactor configuration, extraction unit configuration, etc. Additional variations can be to the types of solvent(s), and correspondingly, the solvent recovery steps may vary depending on the solvent selected.

A rapid liquid-liquid extraction and solvent recovery system for use with fuel or any other chemical processes, can comprise liquid-liquid extraction coupled with a solvent separation process unit. Here, an effective liquid-liquid extraction system can be realized with a small footprint configuration. Moreover, in some embodiments, the desulfurization rate is not limited by rate of gravity separation. This feature makes this technology ideal for at point-of-use desulfurization.

As with other embodiments described herein, in some implementations, fewer than twenty stages of extraction are required to achieve deep desulfurization from diesel and jet fuels with sulfur levels up to 2200 ppm. This allows a system of relatively low size and weight relative to the desulfurization volume capability.

The deep desulfurization process can operate in a self-contained, continuous closed loop system, i.e., not batch. The loop can have any combination of three primary steps/subsystems: An oxidation step; a novel multistage liquid-liquid extraction step; and, hazardous waste or byproduct requiring disposal.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

The invention claimed is:

1. A desulfurization system comprising:
   an oxidation process unit that outputs a sulfur-containing oxidized fuel;
   an extraction fluid container;
   a liquid-liquid extraction unit comprising a plurality of cascaded liquid-liquid extraction stages fluidly cooperative with both the oxidation process unit and the extraction fluid container to successively decrease a sulfur concentration within the sulfur-containing oxidized fuel; and
   a pumping system comprising a plurality of pumps each of which are fluidly cooperative with a respective one of each of the plurality of cascaded liquid-liquid extraction stages such that upon receipt within the liquid-liquid extraction unit of at least a portion of the oxidized fuel from the oxidation process unit and at least a portion of an extraction fluid from the extraction fluid container, the pumping system provides substantially equal flow rates across each of the cascaded liquid-liquid extraction stages within the liquid-liquid extraction unit.

2. The desulfurization system of claim 1, wherein output from each one of the plurality of the liquid-liquid extraction stages comprises a first output containing a reduced sulfur fuel and a second output containing an increased sulfur residual.

3. The desulfurization system of claim 2, further comprising a sulfur separation process unit for the receipt of at least a portion of the second output.

4. The desulfurization system of claim 3, wherein the sulfur separation process unit comprises a distillation column.

5. The desulfurization system of claim 4 wherein the sulfur separation process unit further comprises an oil/aqueous phase separator that is in downstream fluid communication with the distillation column.

6. The desulfurization system of claim 5, further comprising a transportable platform upon which a substantial entirety of the desulfurization system is situated.

7. The desulfurization system of claim 5, further comprising a stationary platform upon which a substantial entirety of the desulfurization system is situated.

8. The desulfurization system of claim 1, wherein the oxidation process unit comprises a reactor that contains a solid catalyst.

9. The desulfurization system of claim 1, further comprising a transportable platform upon which each of the liquid-liquid extraction unit and the pumping system are situated.

10. The desulfurization system of claim 9, wherein the transportable platform comprises a wheeled platform.

11. The desulfurization system of claim 1, wherein the pumping system further comprises a single motor and a power transmission system such that all of the plurality of pumps operate off of the single motor through the power transmission system.

\* \* \* \* \*